US011958679B1

(12) United States Patent
Rustomji et al.

(10) Patent No.: US 11,958,679 B1
(45) Date of Patent: Apr. 16, 2024

(54) MECHANISMS AND METHODS FOR PRESSURIZED FLUID INJECTION AND SEALING

(71) Applicant: SOUTH 8 TECHNOLOGIES, INC., San Diego, CA (US)

(72) Inventors: Cyrus S. Rustomji, San Diego, CA (US); Andrea Biondi, San Diego, CA (US); Nick Wayland, Encinitas, CA (US); Denton Iverson, La Mesa, CA (US); James Royer, San Diego, CA (US); Maciej Lisiak, San Clemente, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 18/383,449

(22) Filed: Oct. 24, 2023

Related U.S. Application Data

(63) Continuation of application No. PCT/US2023/035766, filed on Oct. 24, 2023.

(60) Provisional application No. 63/451,921, filed on Mar. 13, 2023, provisional application No. 63/418,704, filed on Oct. 24, 2022.

(51) Int. Cl.
| | |
|---|---|
| *B65D 83/14* | (2006.01) |
| *H01G 11/80* | (2013.01) |
| *H01G 13/00* | (2013.01) |
| *H01M 50/618* | (2021.01) |
| *H01M 50/645* | (2021.01) |

(52) U.S. Cl.
CPC ............ *B65D 83/756* (2013.01); *H01G 11/80* (2013.01); *H01M 50/618* (2021.01); *H01M 50/645* (2021.01); *H01G 13/00* (2013.01)

(58) Field of Classification Search
CPC .................. B65D 83/756; H01M 50/645; H01M 50/618; H01M 50/627; H01M 10/4207; H01M 2220/20; H01G 11/80; H01G 13/00
USPC ............................................ 141/351; 137/859
See application file for complete search history.

(56) References Cited

U.S. PATENT DOCUMENTS

| | | | | |
|---|---|---|---|---|
| 2,319,532 A | * | 5/1943 | Codney | ............... H01M 50/673 222/394 |
| 5,532,074 A | | 7/1996 | Golben | |
| 5,853,913 A | * | 12/1998 | Stocchiero | ........... H01M 50/673 429/77 |

(Continued)

FOREIGN PATENT DOCUMENTS

| | | | |
|---|---|---|---|
| CN | 113422176 A | * | 9/2021 |
| JP | 2016-152231 | | 8/2016 |
| WO | 2021263122 | | 12/2021 |

OTHER PUBLICATIONS

CN 113422176 A—English Translation (Year: 2021).*
International Search Report dated Feb. 8, 2024 for PCT/US23/35766 (12 pages).

*Primary Examiner* — Timothy P. Kelly
*Assistant Examiner* — Christopher M Afful
(74) *Attorney, Agent, or Firm* — Manuel de la Cerra

(57) ABSTRACT

Mechanisms and methods for injecting and sealing pressurized fluid into containment vessels using a divided valve mechanism are disclosed. The invention describes designs and methods in which a valve may be plugged by an actuator, and then the valve and actuator may then be disjoined, allowing the containment vessel to thereby be sealed without the additional mass or volume of the actuation mechanism and without fluid loss from the containment vessel.

14 Claims, 22 Drawing Sheets

(56) References Cited

U.S. PATENT DOCUMENTS

2010/0086838 A1  4/2010  Kirchev
2013/0083451 A1  4/2013  Wetherill
2020/0067032 A1  2/2020  Davies et al.
2021/0242550 A1  8/2021  Bradford et al.
2023/0246286 A1  8/2023  Rustomji et al.

* cited by examiner

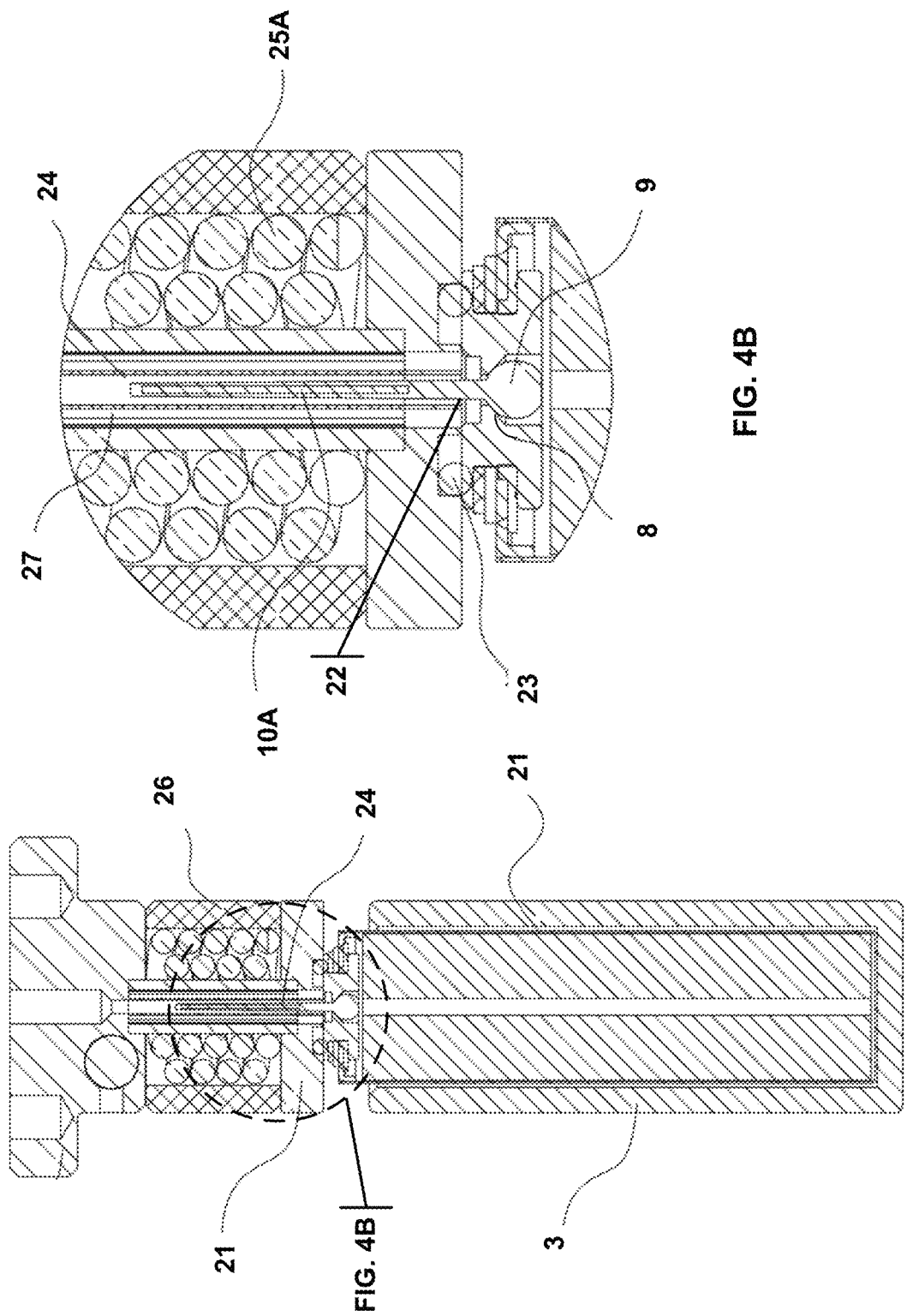

Overview

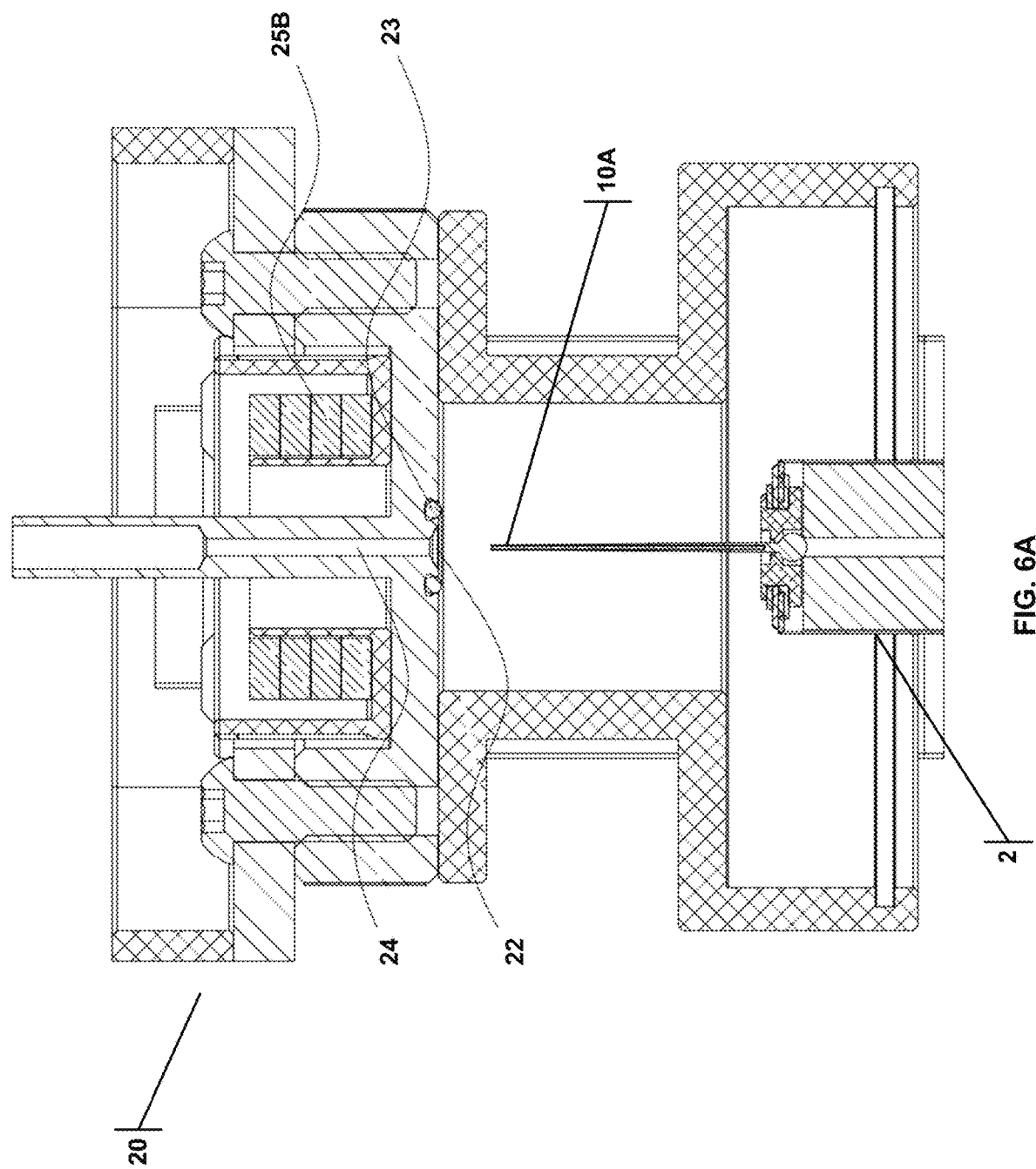

(Various Process Flow)

(Electromagnetic Valve Plug Actuator Process Flow)

(Permanent Magnet Valve Plug Actuator Process Flow)

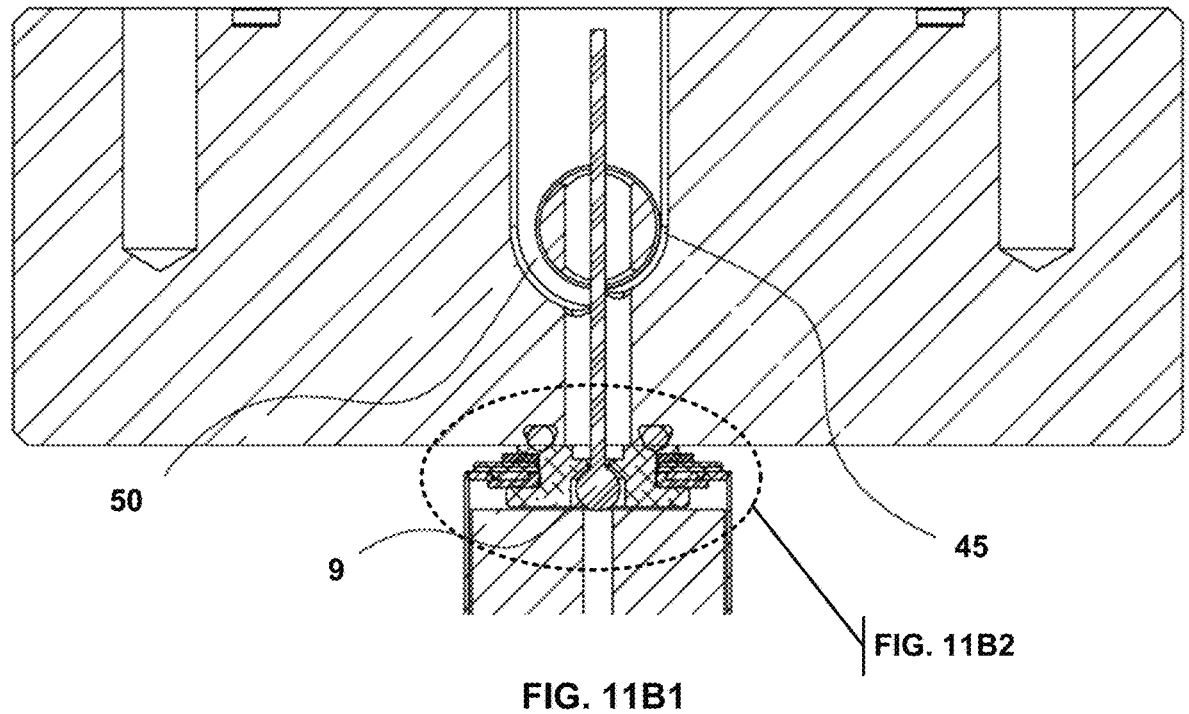
FIG. 11B1
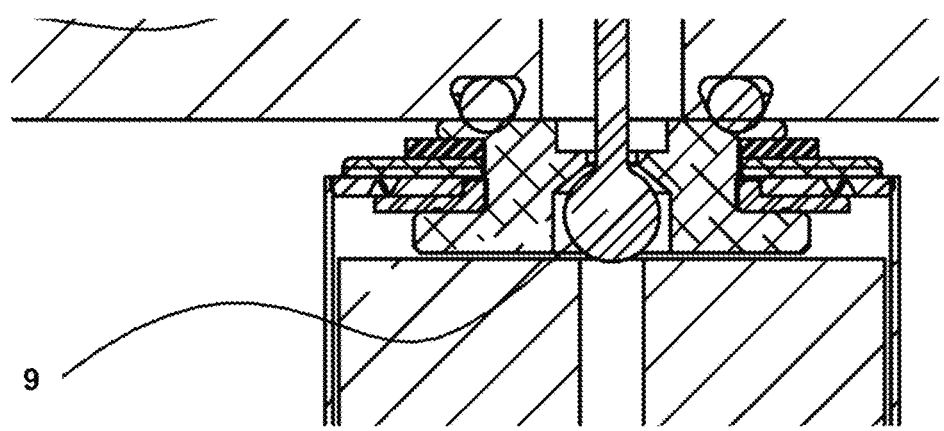
FIG. 11B2

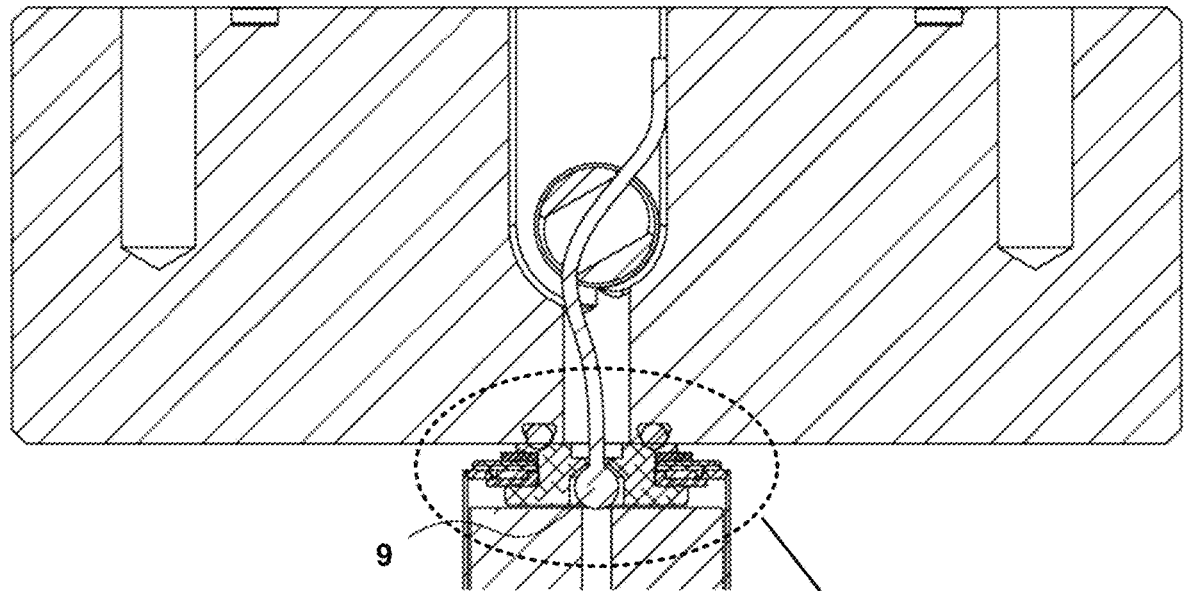
FIG. 11C1
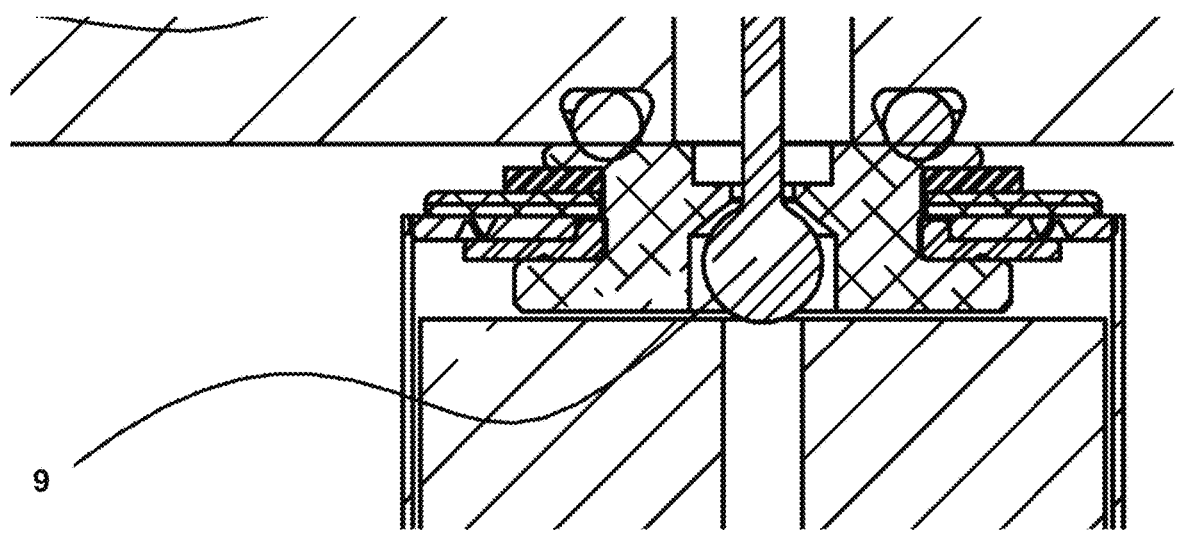
FIG. 11C2

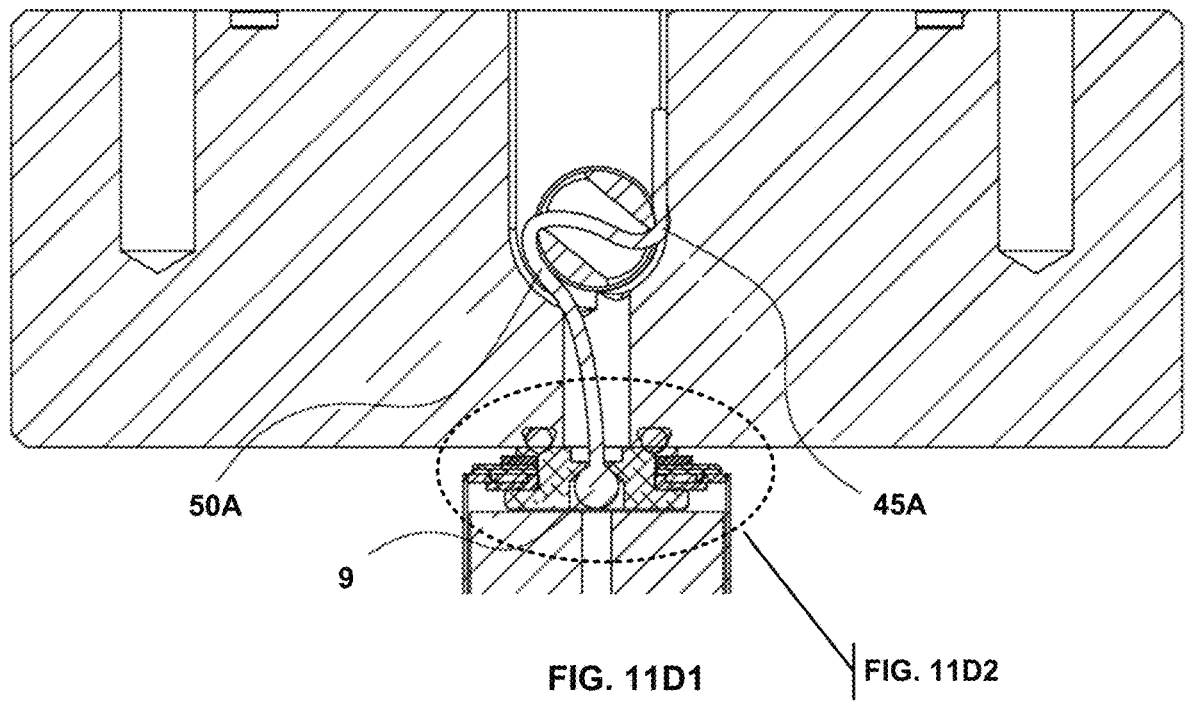
FIG. 11D1
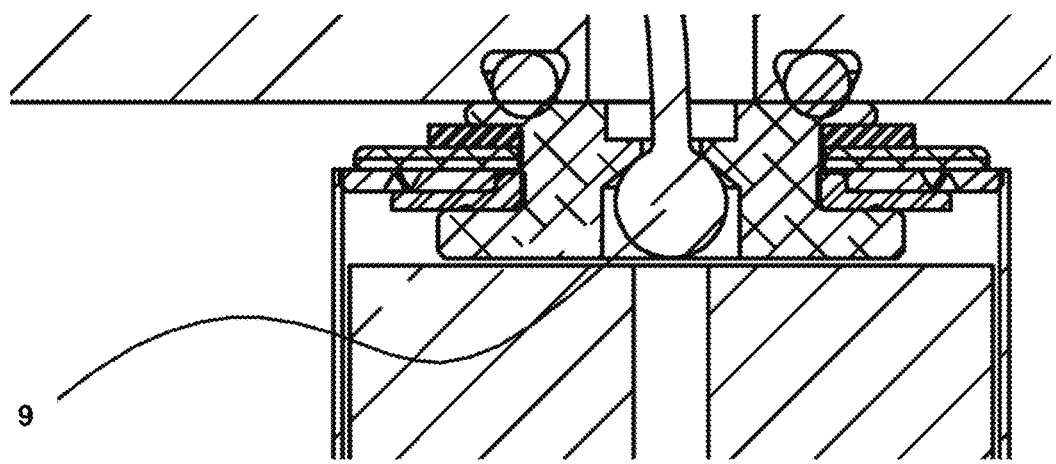
FIG. 11D2

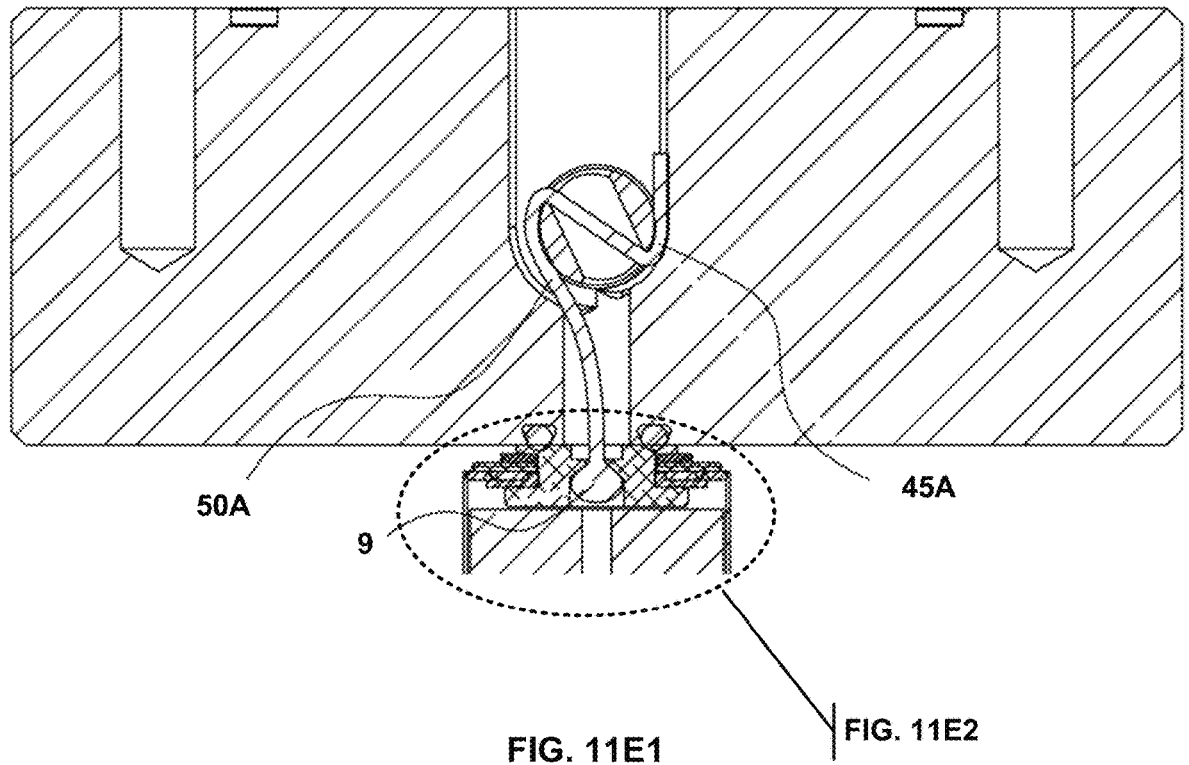
FIG. 11E1
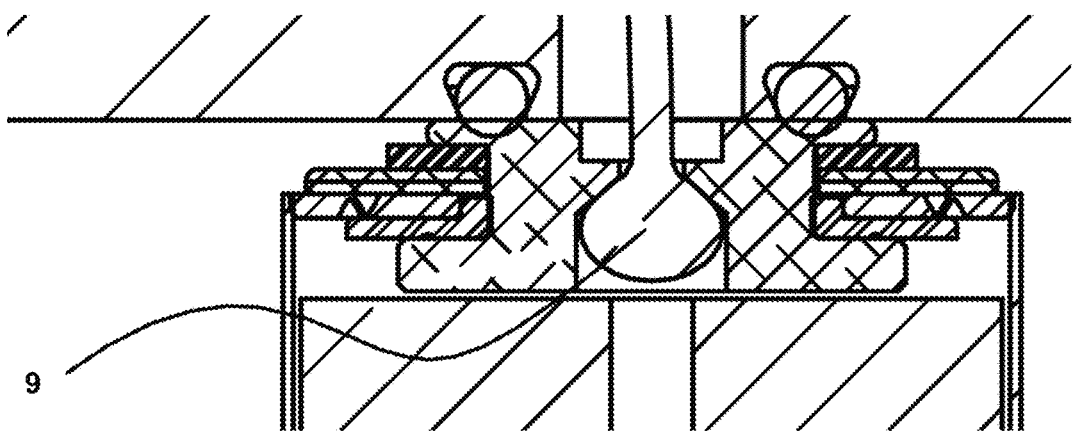
FIG. 11E2

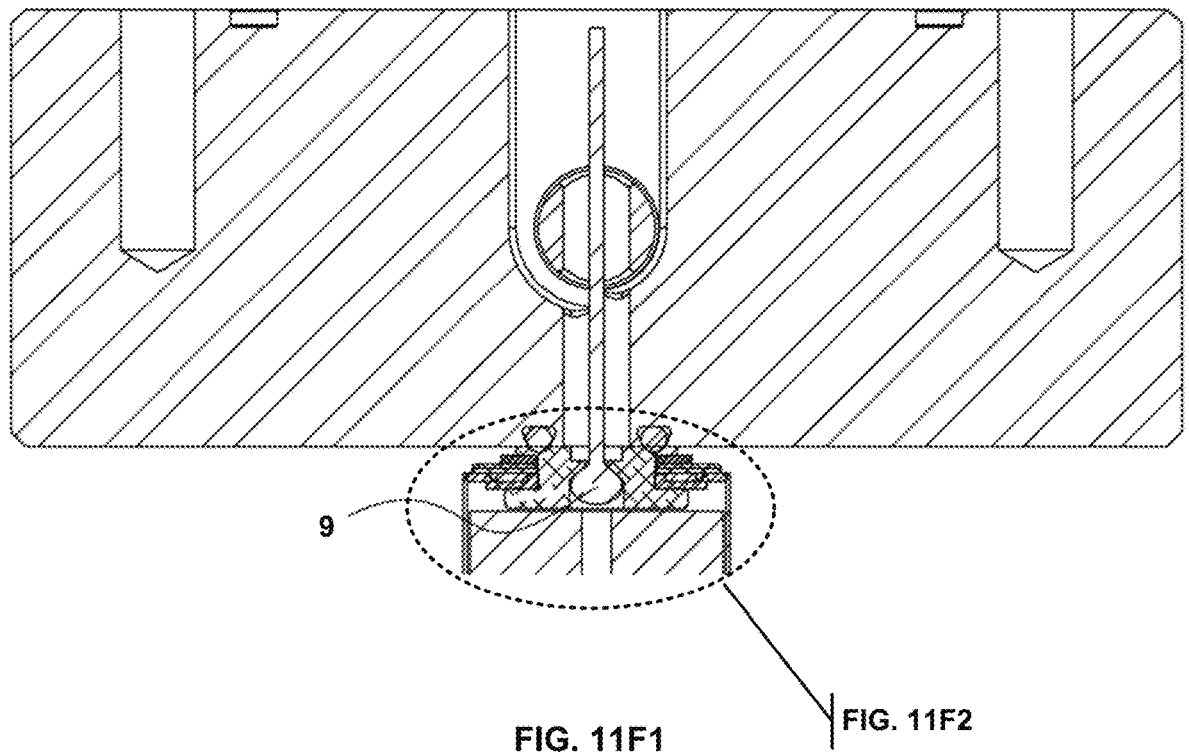
FIG. 11F1
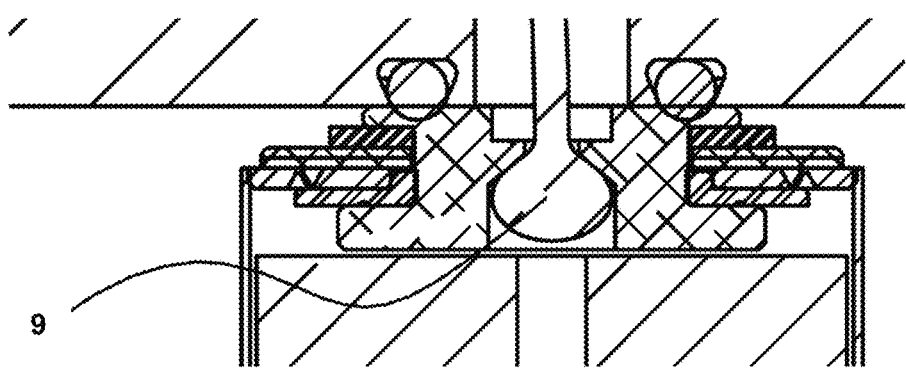
FIG. 11F2

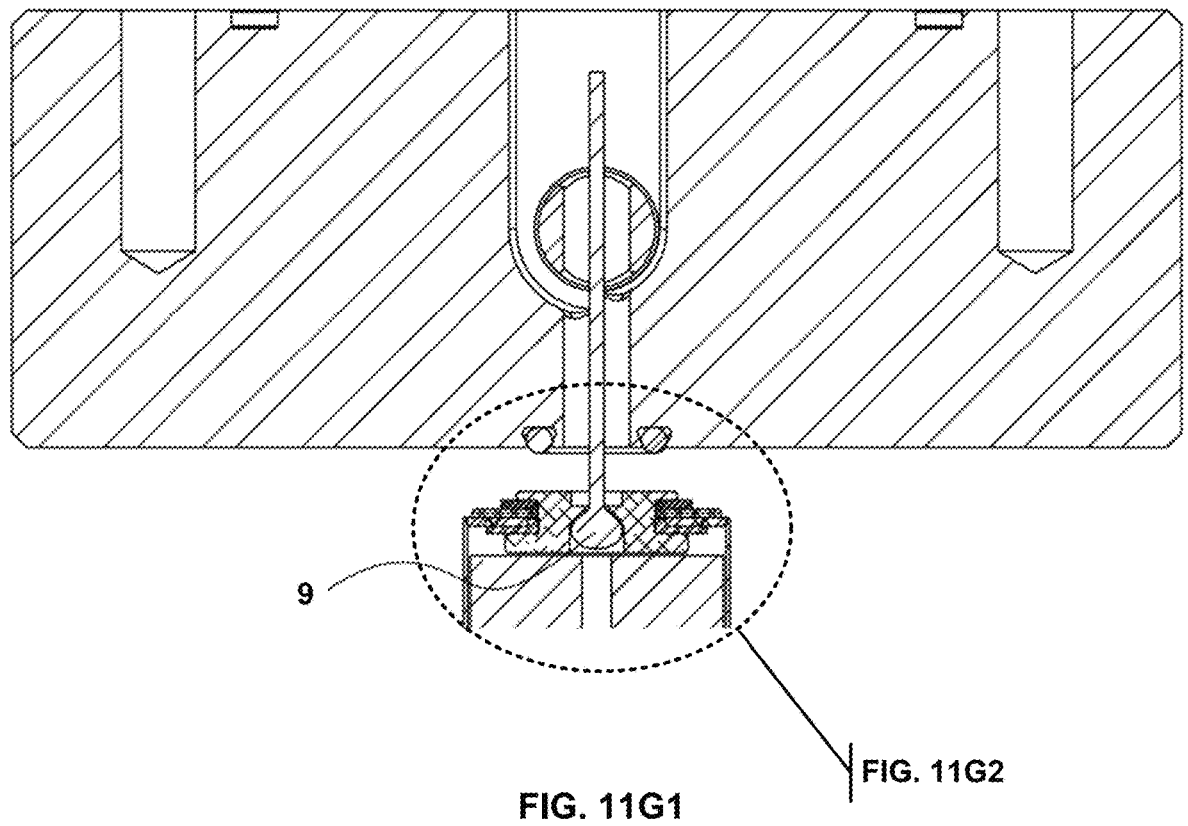
FIG. 11G1
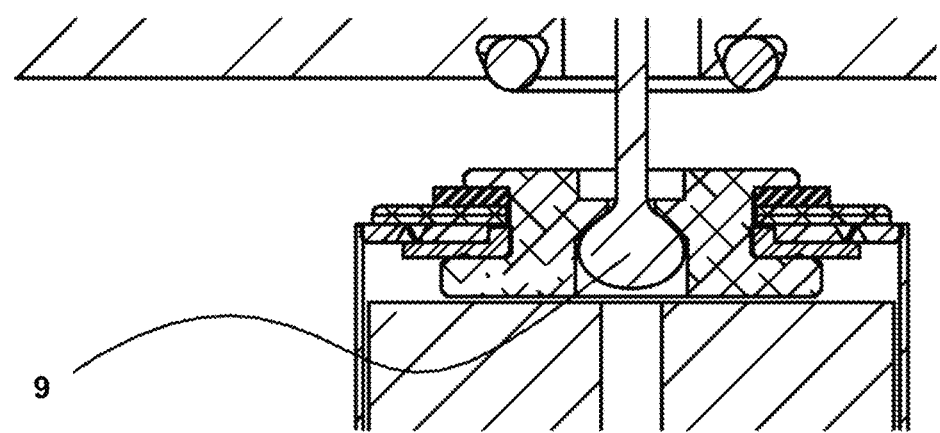
FIG. 11G2

MECHANISMS AND METHODS FOR PRESSURIZED FLUID INJECTION AND SEALING

1.0 CROSS-REFERENCE TO RELATED APPLICATIONS

This application claims priority as a continuation of PCT/US23/35766 entitled "Mechanisms and Methods for Pressurized Fluid Injection and Sealing", filed on Oct. 24, 2023, and priority to Provisional Application 63/418,704, entitled "Mechanisms and Methods for Pressurized Fluid Injection and Sealing", filed on Oct. 24, 2022, and priority to Provisional Application 63/451,921, entitled "Mechanisms and Methods for Pressurized Fluid Injection and Sealing", filed on Mar. 13, 2023. The entire contents of these applications are hereby incorporated by reference in their entirety.

This application is also related to the applications filed below, and the contents of each of these applications are hereby incorporated by reference in their entirety: PCT/US20/048660 filed on Aug. 30, 2020; PCT/US20/020547 filed on Feb. 29, 2020; PCT/US20/048661 filed on Aug. 30, 2020; PCT/US19/032413 filed on May 15, 2019; PCT/US19/032414 filed on May 15, 2019; PCT/US14/066015 filed on Nov. 17, 2014; PCT/US20/026086 filed on Apr. 1, 2020; PCT/US17/029821 filed on Apr. 27, 2017; PCT/US22/031594 filed on May 31, 2022; PCT/US23/11864 filed on Jan. 30, 1923; PCT/US23/17720 filed on Apr. 6, 1923; PCT/US23/28104 filed on Jul. 19, 1923; PCT/US23/28105 filed on Jul. 19, 1923; U.S. Provisional Application 63/418,704 filed on Oct. 24, 2022; U.S. Provisional Application 63/447,751 filed on Feb. 23, 2023; U.S. Provisional Application 63/450,745 filed on Mar. 8, 2023; U.S. Provisional Application 63/461,252 filed on Apr. 22, 1923; U.S. Provisional Application 63/461,387 filed on Apr. 24, 1923; U.S. Provisional Application 63/470,174 filed on May 31, 1923; and U.S. Provisional Application 63/534,213 filed on Aug. 23, 1923.

2.0 FIELD OF THE INVENTION

This invention relates to the mechanisms and methods for the delivery and containment of pressurized fluids from a source to a vessel.

3.0 BACKGROUND

Conventionally, should a pressurized fluid need to be injected and sealed within a vessel using a valve mechanism, the vessel would need to have an integrated valve. Any such existing valve would generally require an integrated primary actuator, adding unnecessary mass, volume, and cost to the containment vessel. For example, a needle valve or ball valve is commonly attached to a containment vessel such that, after filling the containment vessel with a pressurized fluid, the valve may be actuated to be closed, and the connection to the pressurized fluid source may be disconnected or disengaged. However, this valve will remain on the containment vessel.

In contrast, the actuation and disengagement from the pressurized fluid source may be reversed in order, such as in a check valve. A check valve may be used to fill a pressurized fluid into a containment vessel, the connection to the pressurized fluid source may be disconnected, and then the check valve may be actuated by a spring or internal pressure from the containment vessel. However, immediately following the fluid source being disconnected from the containment vessel, there may be a small bit of leakage of fluid from the containment vessel prior to the valve becoming completely sealed in the closed position. Further, a check valve commonly is a larger assembly containing several components, adding mass and volume to the containment vessel.

It would be ideal to have as little mass and volume as possible on a valve as part of a containment vessel body, reducing costs, and to have zero leakage from the containment vessel upon disconnection from the pressurized fluid source. The present invention overcomes these shortcomings.

4.0 SUMMARY

Embodiments of the present disclosure relate to mechanisms and methods for the delivery and containment of pressurized fluids from a source to a vessel. Specifically, a system for injecting a pressurized fluid is disclosed that includes a containment vessel and an injector assembly. The containment vessel has a vessel wall, and a vessel cap is sealed onto the vessel wall. The cap includes a valve seat, a vessel port, a vessel seal interface, and a valve plug having an elongate member extending out of the vessel port. The injector assembly includes an injector seal interface with an injector port and a sealing gasket. The injector assembly also includes a pressurized fluid channel in fluid communication with the injector port and a valve plug actuator constructed to receive the elongate member when the containment vessel is engaged with the injector assembly.

In one embodiment, the system may have the following configurations: an engagement configuration where the elongate member penetrates the injector port, and the seal interface forms a fluid-tight seal with the sealing gasket; a vacuum configuration where the valve plug actuator is actuated, causing the elongate member to push the valve plug in the direction of the longitudinal axis, dislodging the valve plug from the valve seat, and actuating a vacuum in pull a vacuum from the vessel volume; an injection configuration where the pressurized fluid from a container is injected through the injector port, through the vessel port and into the vessel volume; a sealed configuration where the pressurized fluid within the vessel volume forces the valve plug against the valve seat, forming a fluid-tight seal; and a disengage configuration after the sealed configuration, where the containment vessel is separated from the injector assembly.

The valve plug actuator may be a permanent magnet and the actuation of the valve plug actuator may comprise moving the permanent magnet towards the containment vessel in the direction of the longitudinal axis. The valve plug actuator may be is an electro-magnet and the actuation of the valve plug actuator may comprise electrifying the electro-magnet.

In another embodiment, the system may have the following configurations: an engagement configuration where the elongate member penetrates with the injector port and is disposed in the rotary shaft actuator, and the seal interface forms a fluid-tight seal with the sealing gasket (23); an injection configuration where the pressurized fluid from a container is injected through the injector port, through the vessel port and into the vessel volume; and a sealed configuration where the rotary shaft actuator is actuated, causing the elongate member to pull the valve plug in the direction of the longitudinal axis, thus forcing the valve plug against the valve seat, forming a fluid-tight seal. The sealed configuration may also include deforming the valve plug to form the fluid-tight seal and spooling the elongate member around the rotary shaft actuator. The system may also have a disengaged configuration after the sealed configuration, where the rotary shaft actuator is actuated in reverse as compared to the sealed configuration, and the containment vessel is separated from the injector assembly.

A clearance zone and an interference zone may both be adjacent to the rotary shaft actuator. The elongate member may have a separation point to separate the elongate member from the valve plug. The containment vessel may be an electrochemical energy storage device, such as a battery or a capacitor. The pressurized injected fluid may be a liquefied gas electrolyte.

Methods to use the system are also disclosed.

Alternative or additional embodiments described herein provide a method of using the electrolyte composition or device comprising one or more of the features of the foregoing description or of any description elsewhere herein.

5.0 BRIEF DESCRIPTION OF THE DRAWINGS

FIG. 4A illustrates in cross section the containment vessel mated with the injector assembly.

FIG. 4B is an enlarged view of FIG. 4A.

FIG. 6A is a cross sectional view of the containment vessel preparing to mate with the injector assembly implementing a permanent magnet actuator.

Figure 8:
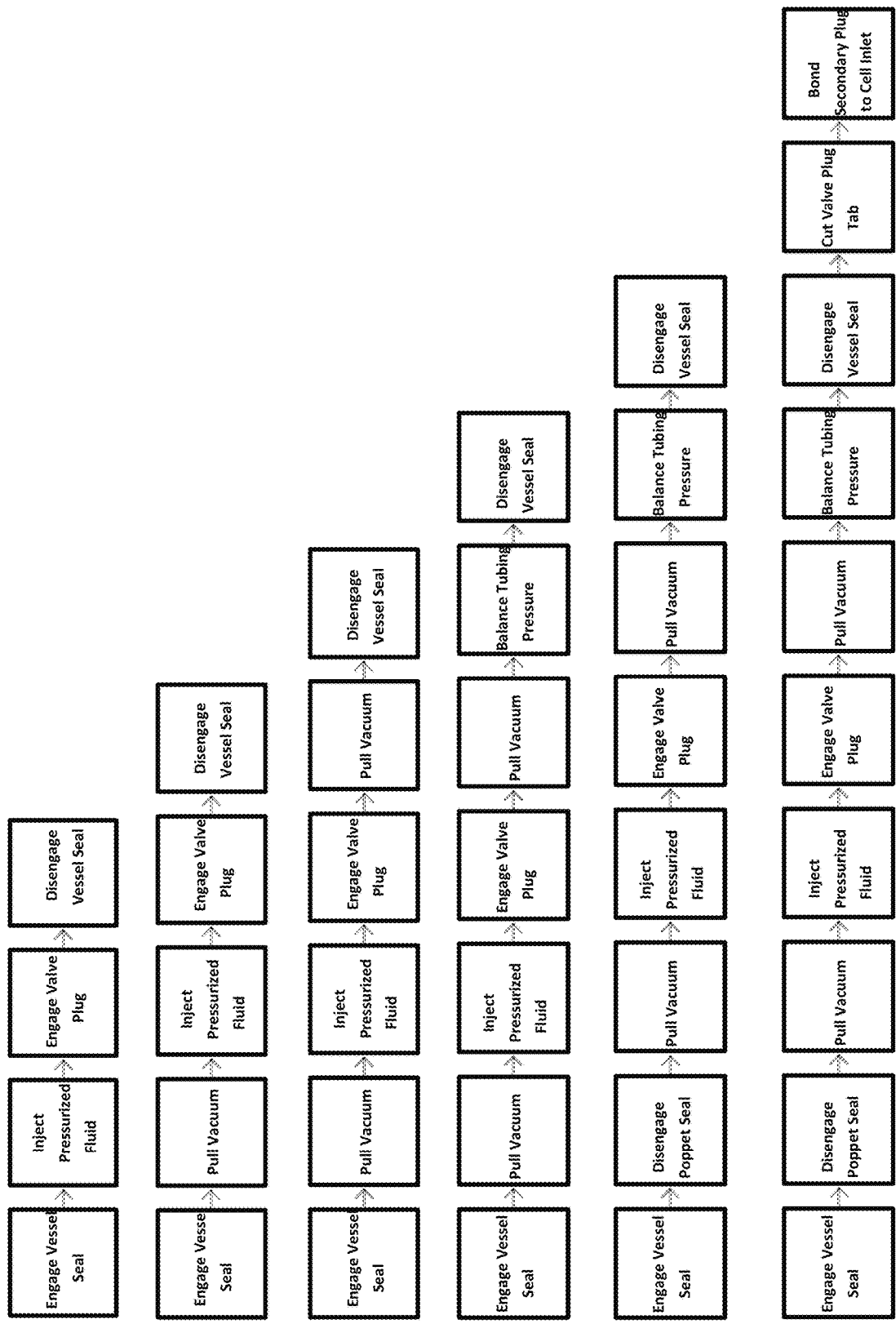

FIG. 8 diagrams various process flows.

Figure 9:
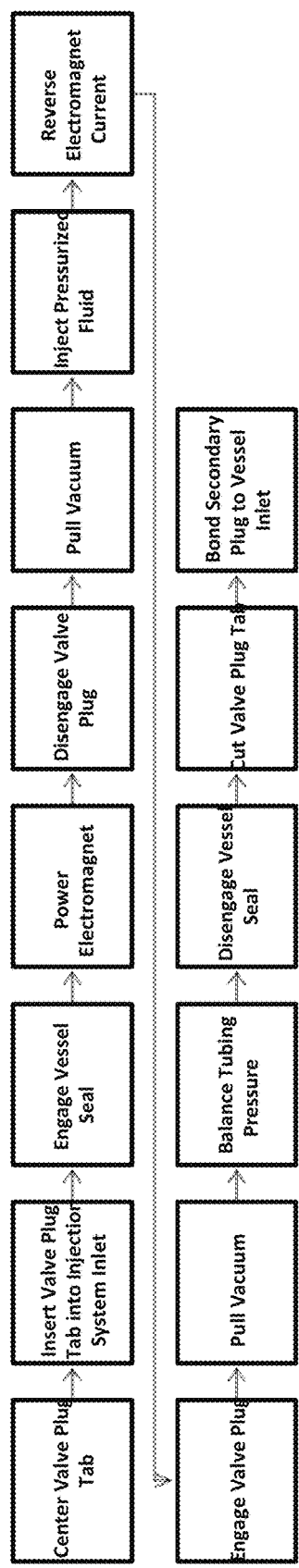

FIG. 9 illustrates a process flow for use with an electromagnetic actuator.

Figure 10:
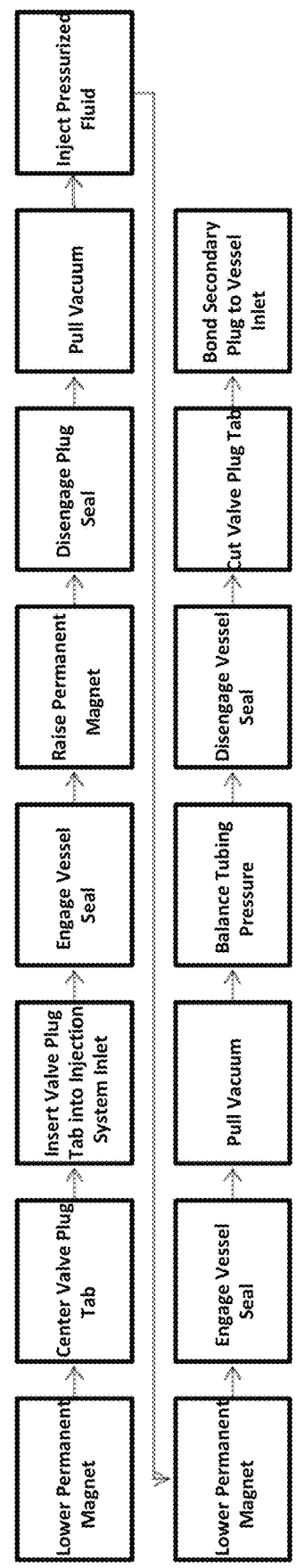

FIG. 10 illustrates a process flow for use with a permanent magnet.

Figure 11A:
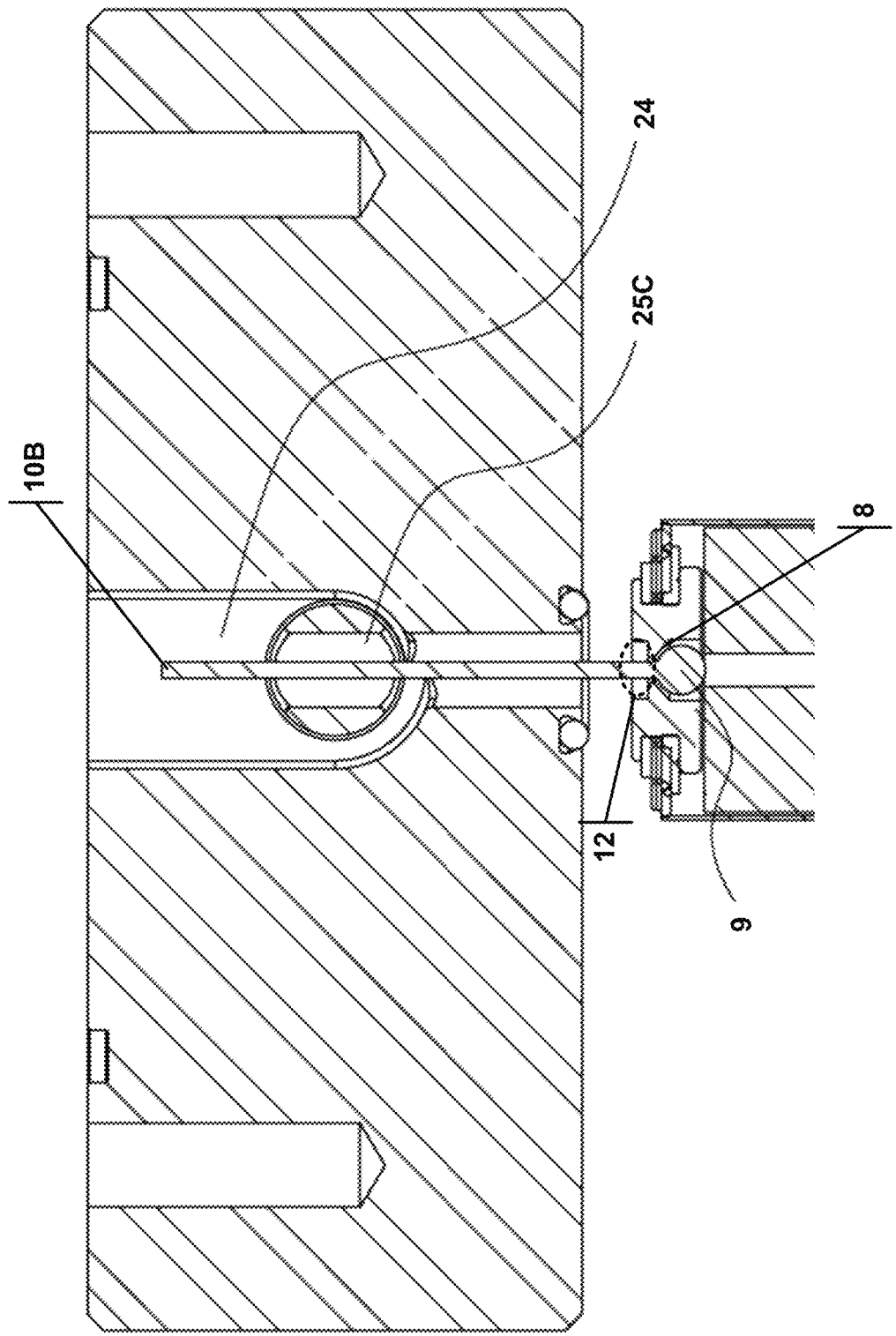

FIG. 11A illustrates in cross section the containment vessel with a valve plug and an elongate member initially mating with the injector assembly.

FIG. 11B1 illustrates in cross section the containment vessel and injector assembly of FIG. 11A at the beginning of the mechanical sealing procedure.

Figure 1A:
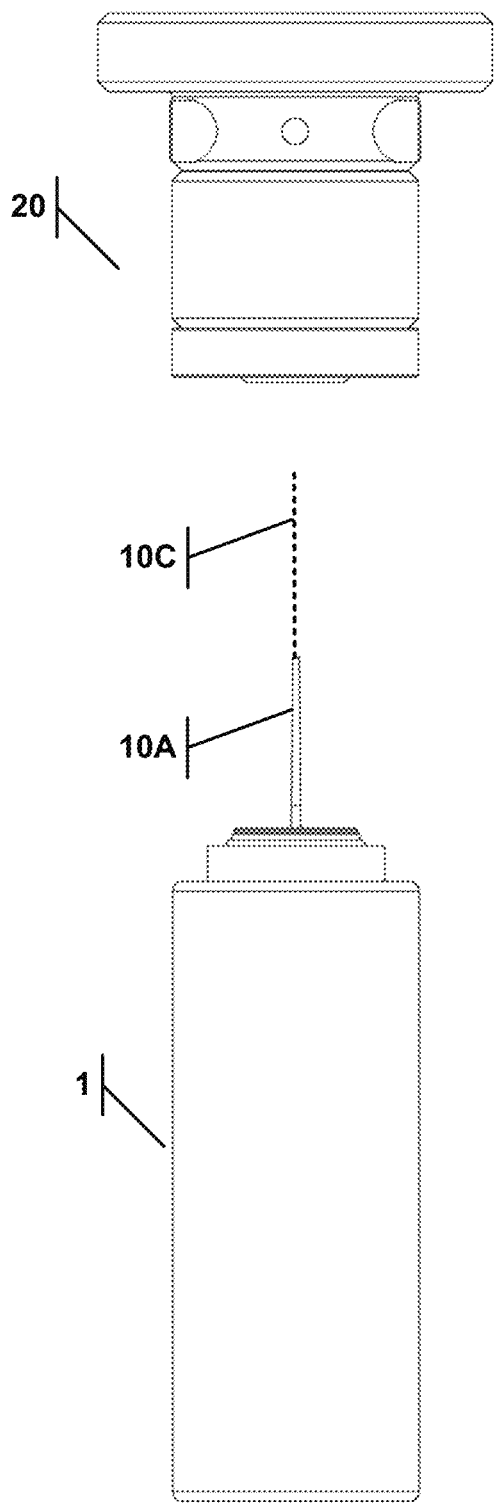
FIG. 1A illustrates a pressurized fluid injection system that includes a containment vessel assembly and an injector assembly.
Figure 1B:
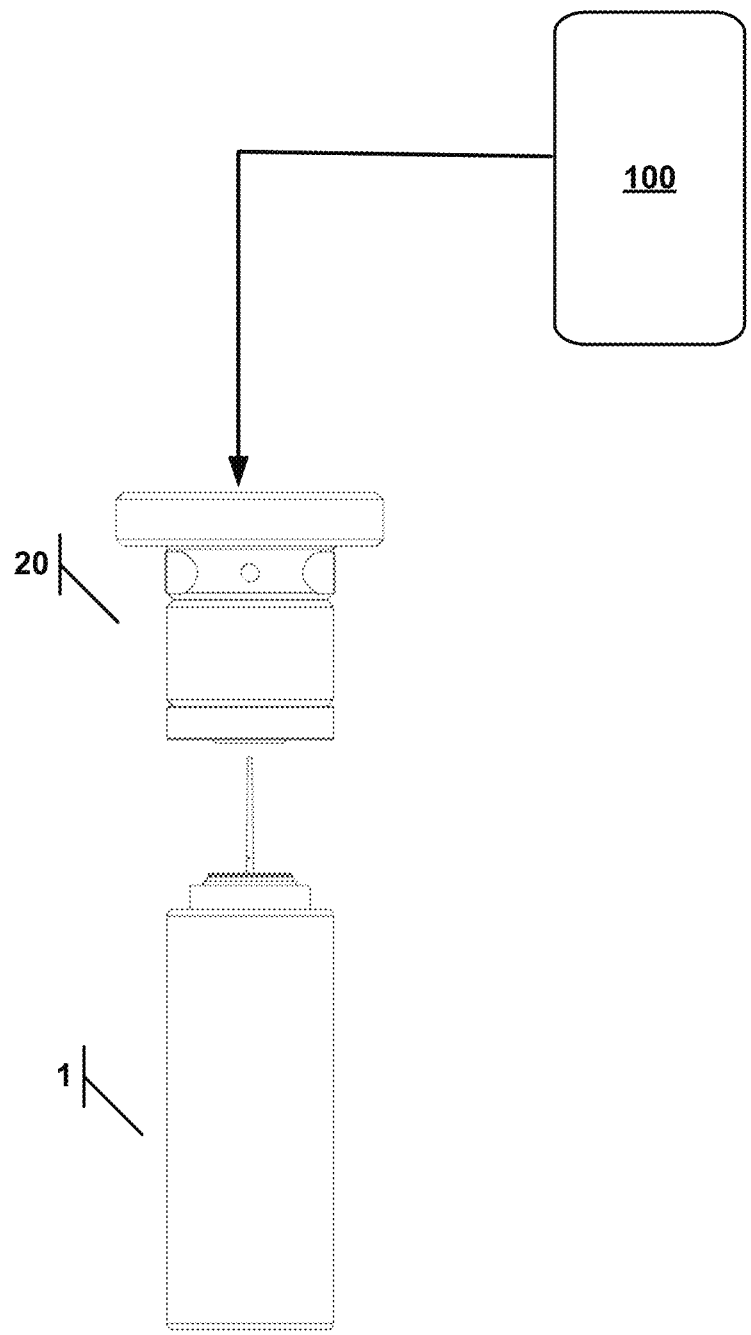
FIG. 1B illustrates the pressurized fluid injection system of FIG. 1A connected to a container containing a pressurize fluid.
Figure 2:
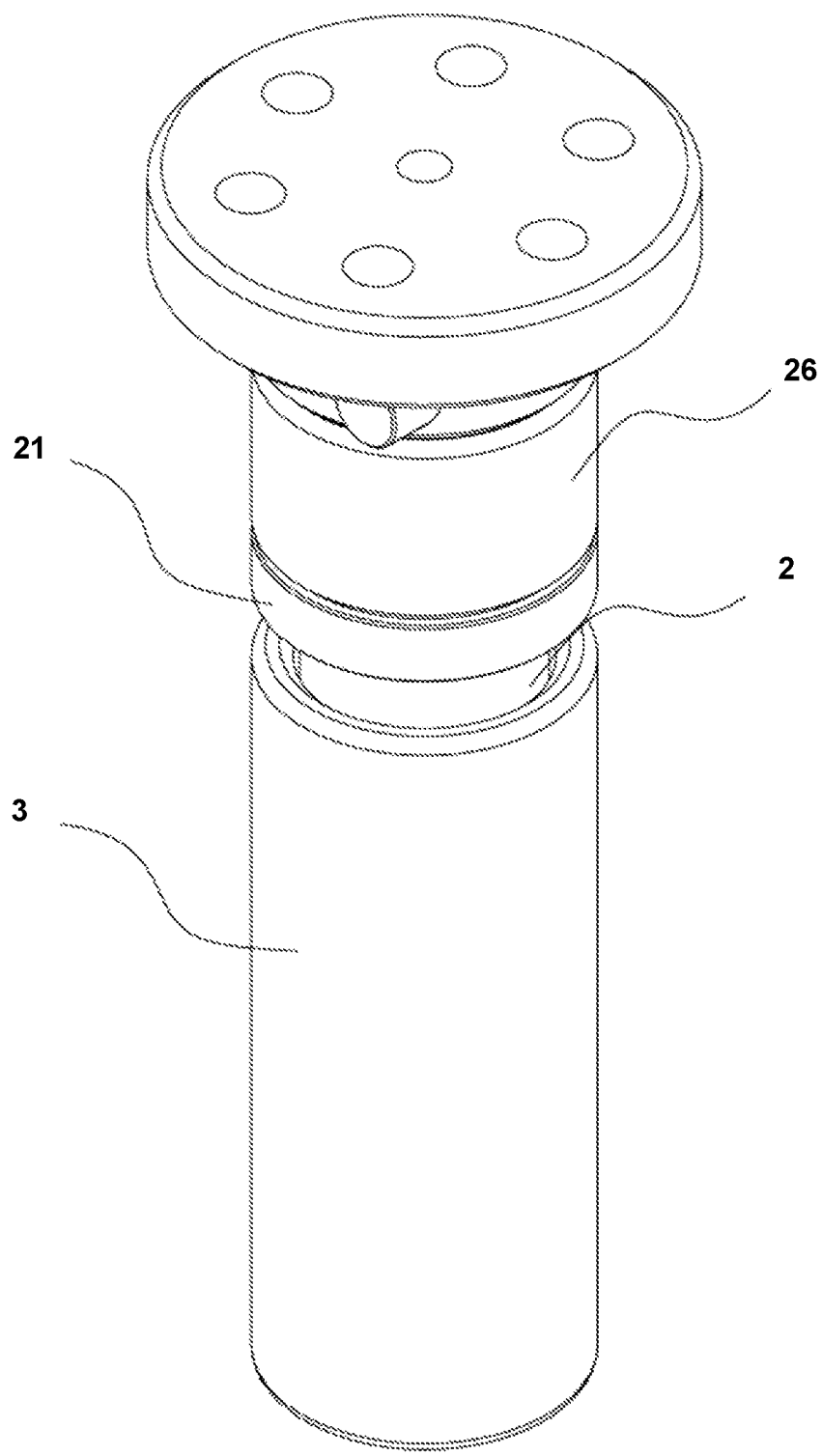
FIG. 2 illustrates a containment vessel mated with the injector assembly.
Figure 3B:
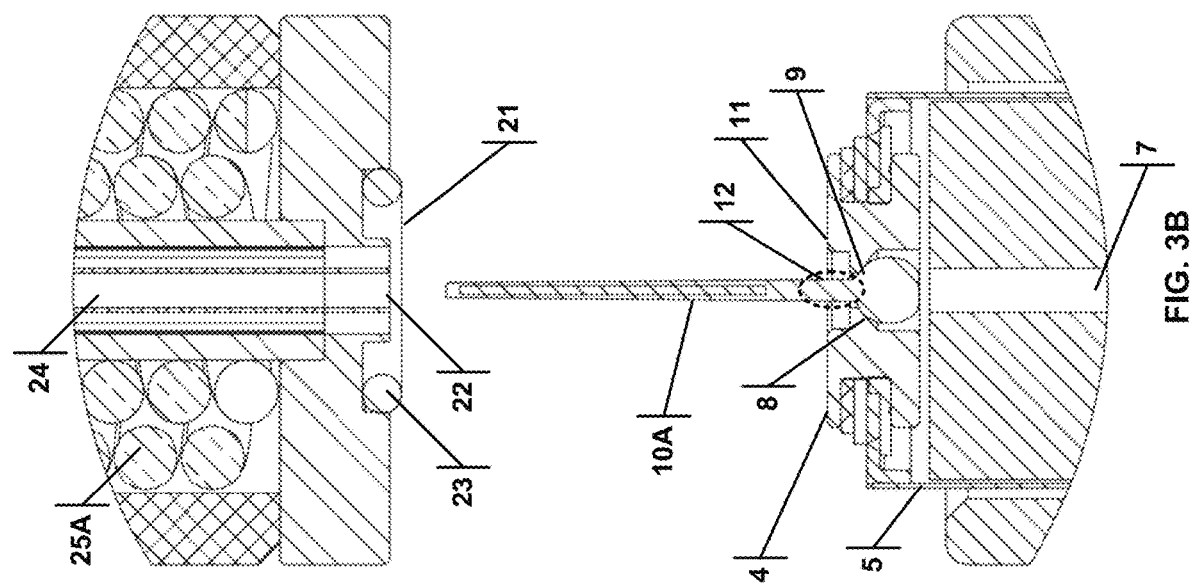
FIG. 3B is an enlarged view of FIG. 3A.
Figure 3A:
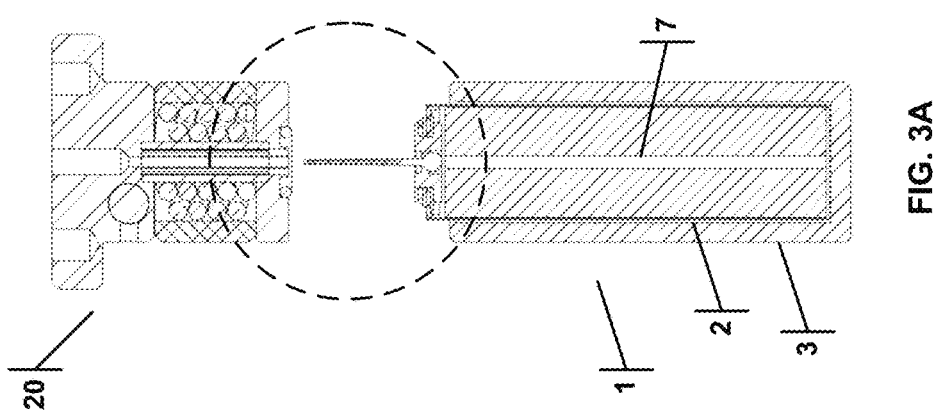
FIG. 3A illustrates in a cross section the containment vessel separated from the injector assembly by implementing an electromagnet actuator.

FIG. 11B2 is an enlarged view of the valve plug of FIG. 11B1.

FIG. 11C1 illustrates in cross section the containment vessel and injector assembly of FIG. 11A as the rotary shaft actuator pulls the elongate member and thus induces the valve plug to seal the containment vessel.

FIG. 11C2 is an enlarged view of the valve plug of FIG. 11C1.

FIG. 11D1 illustrates in cross section the containment vessel and injector assembly of FIG. 11A as the rotary shaft actuator continues to pull the elongate member and thus induces the valve plug to seal the containment vessel.

FIG. 11D2 is an enlarged view of the valve plug of FIG. 11D1.

FIG. 11E1 illustrates in cross section the containment vessel and injector assembly of FIG. 11A as the rotary shaft actuator continues to pull the elongate member and the valve plug, deforming the valve plug and sealing the containment vessel.

FIG. 11E2 is an enlarged view of the deformed valve plug of FIG. 11E1.

FIG. 11F1 illustrates in cross section the containment vessel and injector assembly of FIG. 11A as the rotary shaft actuator counter-rotates to straighten the elongate member in preparation for dislodging the containment vessel from the injector assembly.

FIG. 11F2 is an enlarged view of the deformed valve plug of FIG. 11F1.

FIG. 11G1 illustrates in cross section the containment vessel and injector assembly of FIG. 11A as the containment vessel is dislodged from the injector assembly.

FIG. 11G2 is an enlarged view of the deformed valve plug of FIG. 11G1.

Figure 12:
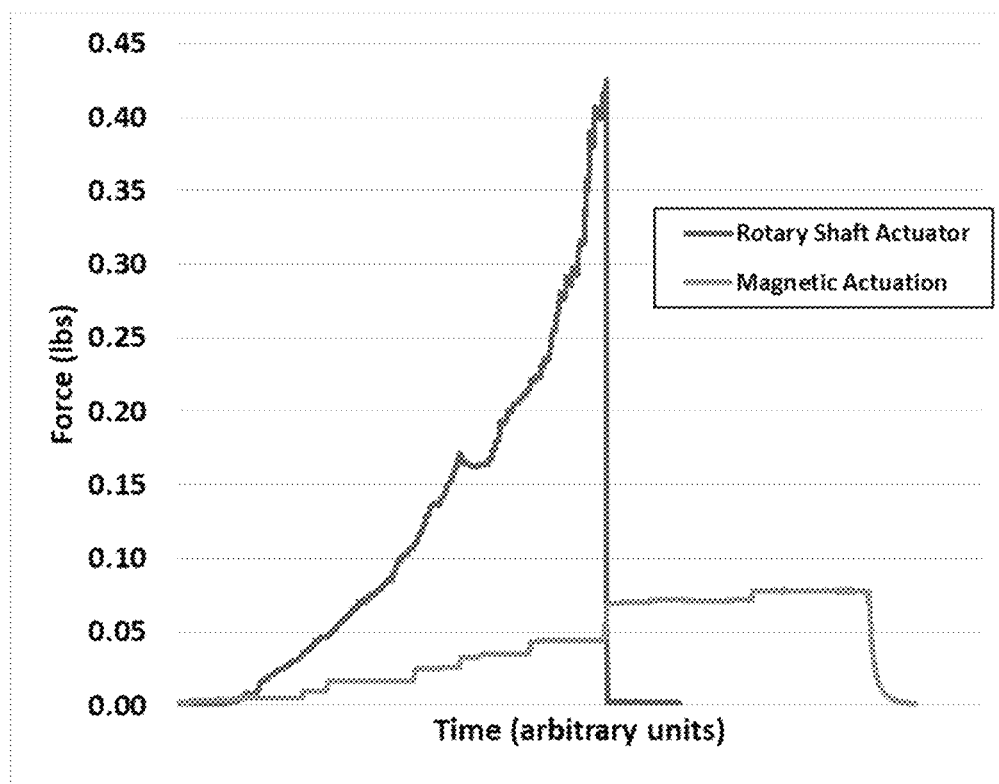

FIG. 12 is a graphical comparison of the magnetic actuation versus the rotary shaft actuation.

6.0 DETAILED DESCRIPTION

Reference is made herein to some specific examples of the present invention, including any best modes contemplated by the inventor for carrying out the invention. Examples of these specific embodiments are illustrated in the accompanying FIGURES. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached FIGURES and is provided for ease of reference, where like reference numerals designate corresponding features throughout the specification and FIGURES:

1 Containment Vessel Assembly
2 Containment Vessel
3 Containment Vessel Holder
4 Vessel Cap
5 Vessel Wall
7 Vessel Volume
8 Valve Seat
9 Valve Plug
10A Elongate Member (Magnetic)
10B Elongate Member (Mechanical)
10C Elongate Member Longitudinal Axis
11 Vessel Seal Interface
12 Vessel Port
20 Injector Assembly
21 Injector Seal Interface
22 Injector Port
23 Sealing Gasket
24 Pressurized Fluid Channel
25A Valve Plug Actuator (Solenoid Coil)
25B Valve Plug Actuator (Permanent Magnet)
25B1 Movement of Valve Plug Actuator (Permanent Magnet)
25C Valve Rotary Shaft Actuator
26 Actuator Housing
27 Elongate Member Centering Piece
30 Valve Plug Dislodged
32 Elongate Member Separation Point
35 Secondary Plug
45 Interference Zone
45A Elongate Member in Interference Zone
50 Clearance Zone
50A Elongate Member in Clearance Zone
100 Container Disclosed is an injection system by which a pressurized fluid is transferred from a source into a containment vessel, in which the pressurized fluid is finally sealed using a novel valve mechanism wherein valve actuator is not permanently linked to the valve or the containment vessel, referred to as a "divided valve actuation and sealing mechanism". Also disclosed are various methods by which such an injection system and divided valve actuation and sealing mechanism could be used to fill a containment vessel with pressurized fluid.

The disclosed injection system uses a valve plug mechanism, located on a containment vessel, and a plug actuator, which are two separate bodies. The valve plug mechanism and the plug actuator may be separated, or disengaged, after the plug is engaged and seal the containment vessel. This method allows the plug to be separated from the actuation mechanism, lowering cost and mass of the containment vessel, and allowing for zero leakage from the containment vessel upon disengagement.

An injection system sealing interface between the pressure containment vessel and valve plug actuator, or plug actuator housing, or injection system assembly creates a seal with an interface seal material such as a sealing gasket, allowing for pressurized fluids to be delivered through the pressurized fluid channel and into the containment vessel. A pressurized fluid is then passed through the pressurized fluid channel, around the valve plug, and into the containment vessel. The valve plug actuator is then actuated thereby sealing the containment vessel closed. After the valve plug is sealed, the containment vessel may be disengaged from the injector system sealing interface. Because the plug has already been sealed post-actuation but prior to secondary sealing, there is zero leakage of the pressurized fluid from the containment vessel during the disengagement. After separation of the containment vessel from the injector assembly (also referred to as disengagement) is achieved, the valve plug may be reinforced by the pressure differential between the internal pressure of the containment vessel and pressure outside the containment vessel, typically atmospheric pressure, further ensuring the leak tightness of the containment vessel. After disengagement, a secondary plug (see FIGS. 8A-8C), such as a metal plate or cylinder, may be attached to the containment vessel to create a more robust and permanent seal and to prevent tampering with the valve plug.

Embodiments of the present disclosure relate to actuation mechanisms that manipulate the position of the valve, using a valve plug actuator as well as the geometry of the valve plug and secondary plug. Other embodiments of the present disclosure relate to the methods of operating the injection system and divided valve actuation and sealing mechanism.

Shown in FIGS. 1A and 1B is a pressurized fluid injection system that includes a containment vessel assembly 1 and an injector assembly 20 connected to a pressurized fluid source or container 100. After filling the container, the valve plug actuator may actuate with physical or non-physical contact with the actuator plug. Physical contact actuation may include a pull or push action to actuate the plug. Non-physical contact actuation may be magnetic or electromagnetic in nature.

An example of a non-physical contact actuation method is described with reference to FIGS. 2A-11. Specifically, FIGS. 3A-4B illustrate an injector assembly 20 with an electromagnetic valve plug actuator 25A. The injector assembly 20 includes an injector seal interface 21 with an injector port 22 and a sealing gasket 23. A pressurized fluid channel 24 is in fluid communication with the injection system port 22. A valve plug actuator 25A receives an elongate member 10A when the containment vessel 2 is engaged with the injector assembly 20. The containment vessel 2 includes a vessel wall 5 (or walls), and a vessel cap 4 is sealed onto the vessel wall 5. The cap 4 further includes a valve seat 8, a vessel port 12, vessel seal interface 11, and a valve plug 9 having an elongate member 10A extending out of the vessel port 12. The containment vessel 2 has a vessel volume 7 defined by the vessel cap 4 and the vessel wall 5, and that volume 7 is in fluid commination with the vessel port 12. The elongate member defines a longitudinal axis 10C (see FIG. 1A).

The valve plug actuator 25A may be a solenoid coil (i.e., electro-magnet) that induces a magnetic force on magnetic or paramagnetic material embedded into or attached to the elongate member 10A. This allows the injector assembly 20 to dislodge the valve plug 9 during injection. The valve plug 9 may itself be made of a ferromagnetic or a paramagnetic material, in which case the elongate member 10A is not used because the valve plug actuator 25A may act directly on the valve plug.

Figure 5:
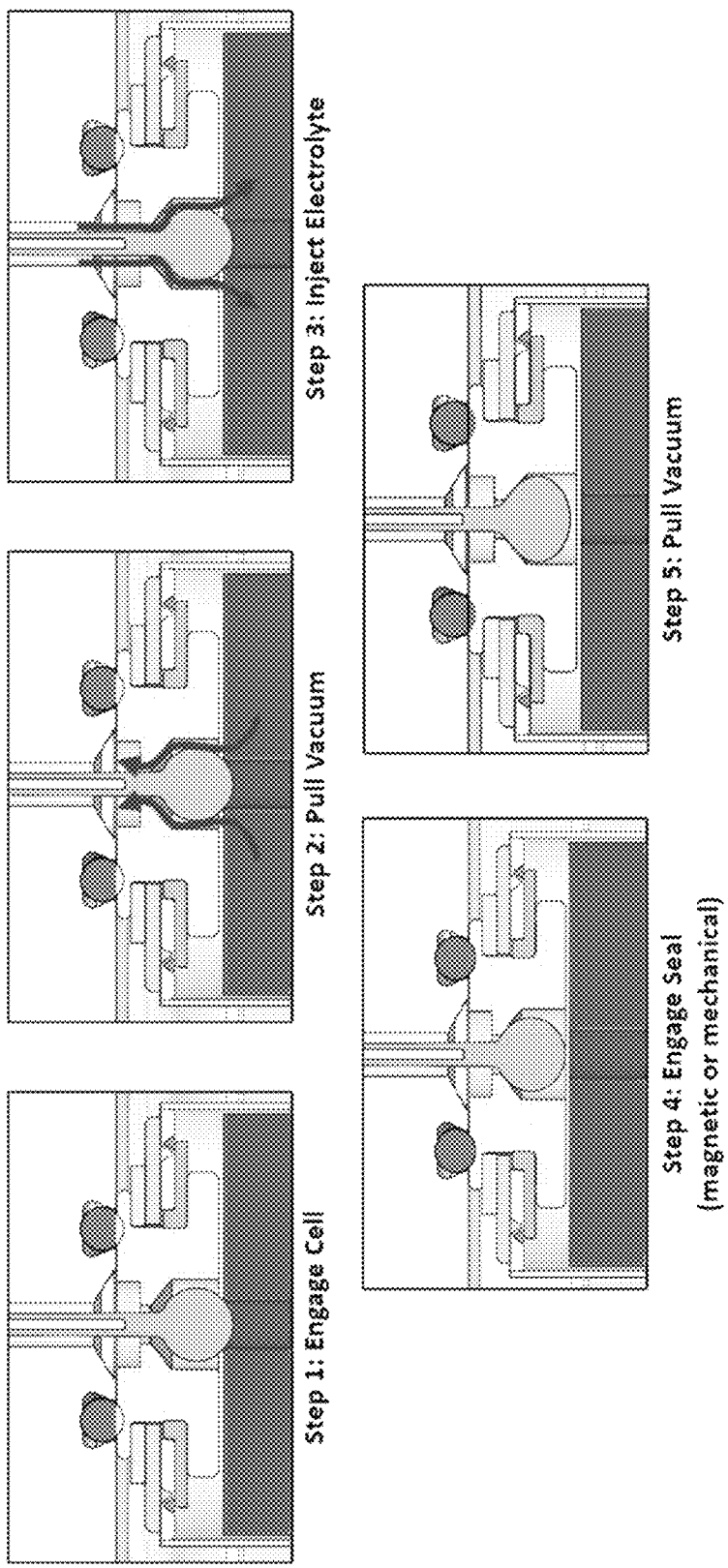
FIG. 5 is an overview of the injection steps.

FIG. 5 illustrates an overview of the steps in filling a containment vessel using the methods and structures just discussed. In step one (engagement), the elongate member 10A penetrates the injector port 22, and the seal interface 11 forms a fluid-tight seal with the sealing gasket 23. During step two (vacuum), the valve plug actuator 25A is actuated, causing the elongate member 10A to push the valve plug 9 in the direction of the longitudinal axis 10C, dislodging the valve plug 9 from the valve seat 8, and a vacuum is pulled from the vessel volume 7. In step three (injection), the pressurized fluid from a container 100 is injected through the injector port 22, through the vessel port 12 and into the vessel volume 7. During step four (sealing), the pressurized fluid within the vessel volume 7 forces the valve plug 9 against the valve seat 8 forming a fluid-tight seal. Optionally, the electromagnet may be reversed to further pull the elongate member 10A (and thus the valve plug 9) to seat with the valve seat 8. In an optional step five, a vacuum pulls on the pressurized fluid channel after pressurized fluid injection into the containment vessel, causing the valve plug 9 to more securely seat with the valve seat 8.

Figure 6B:
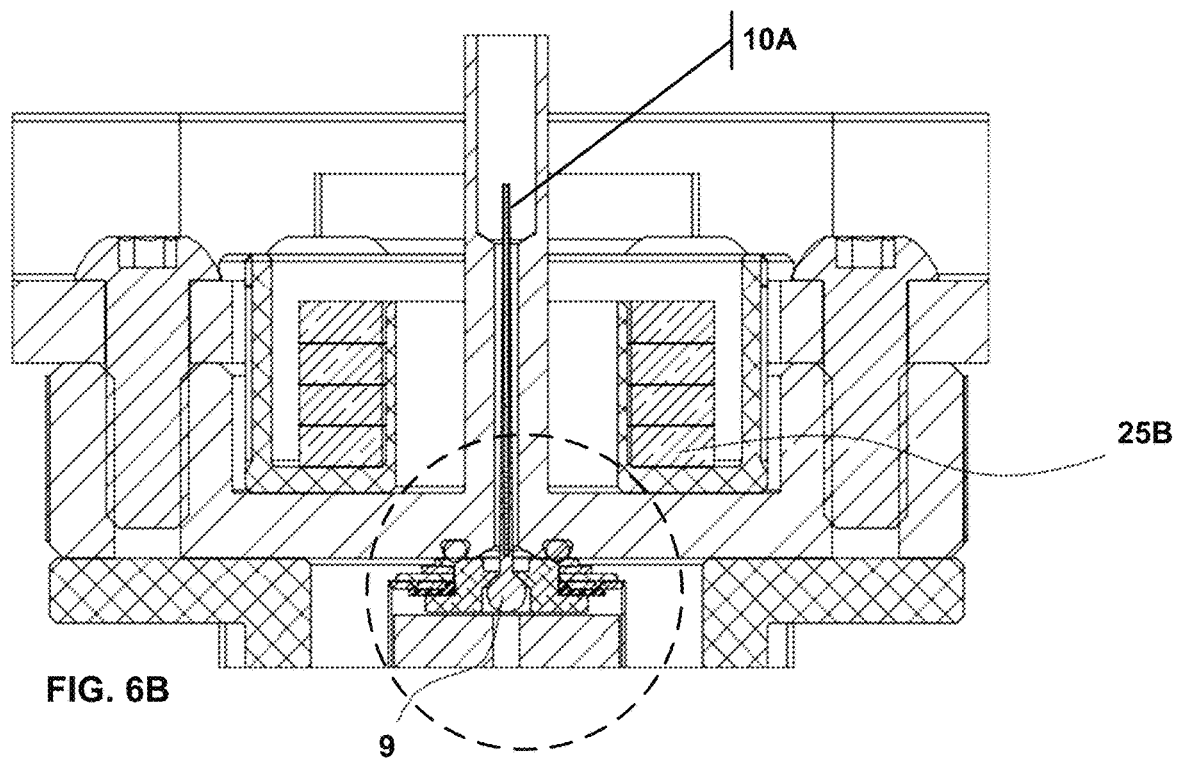
FIG. 6B is the embodiment of FIG. 6A, where the containment vessel is mated with the injector assembly.
Figure 6C:
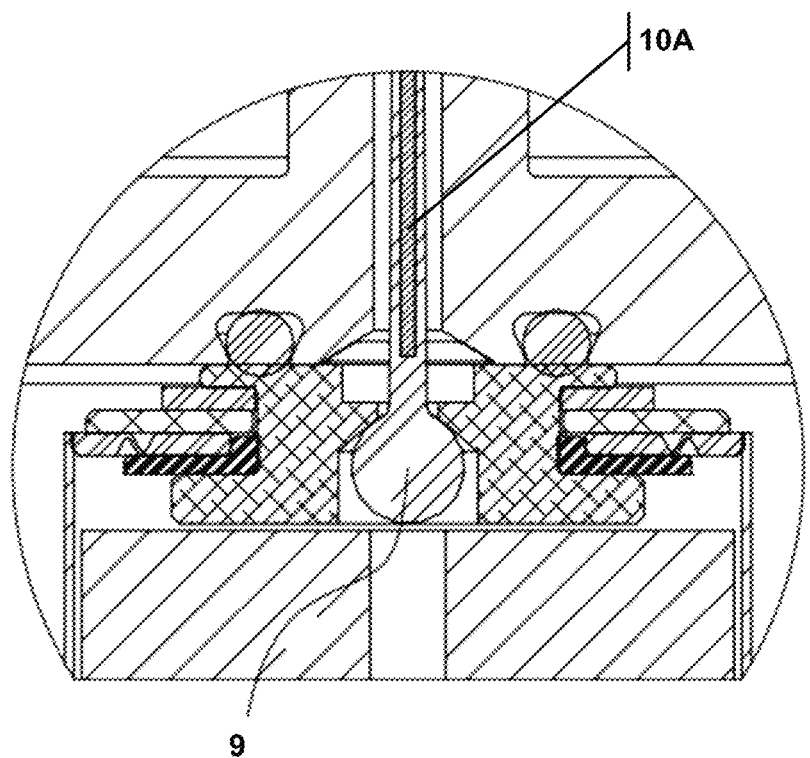
FIG. 6C is an enlarged view of FIG. 6B.
Figure 6D:
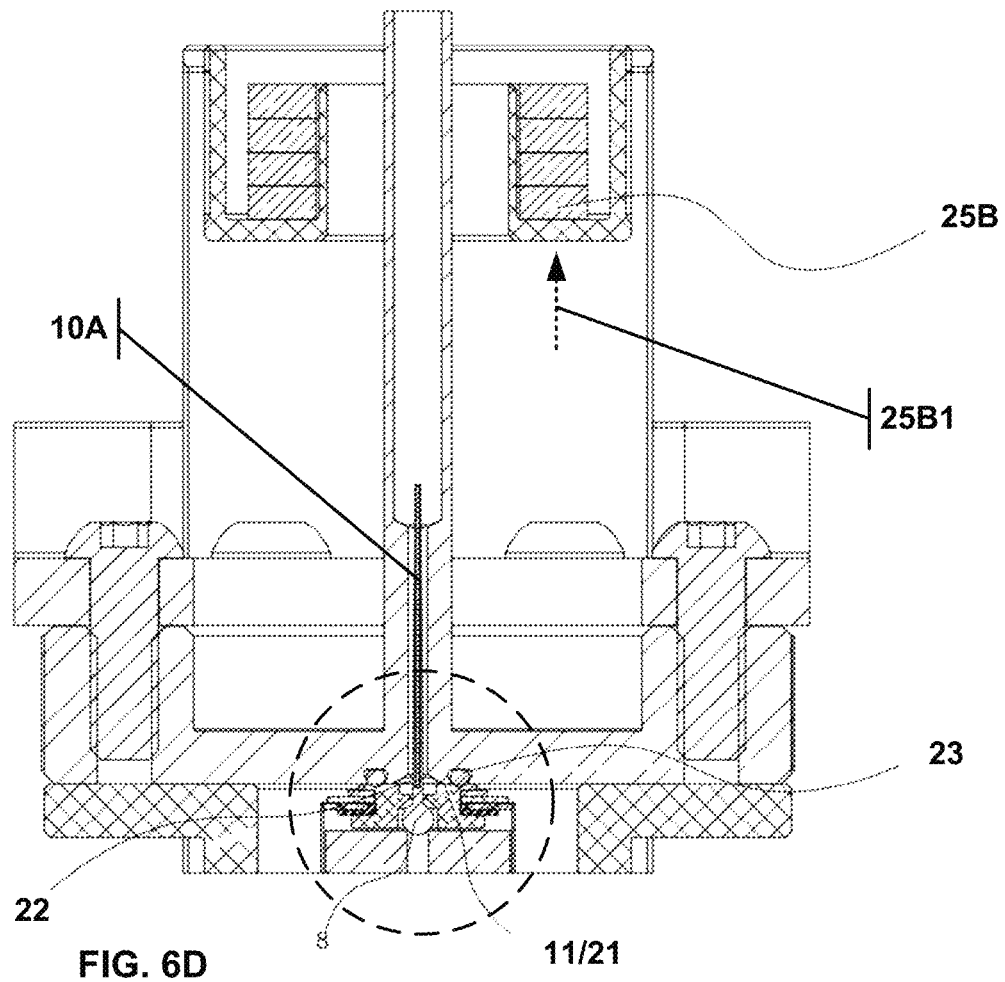
FIG. 6D is the embodiment of FIG. 6A, where the containment vessel is mated with the injector assembly, and the permanent magnet has been moved, thus dislodging the valve plug.
Figure 6E:
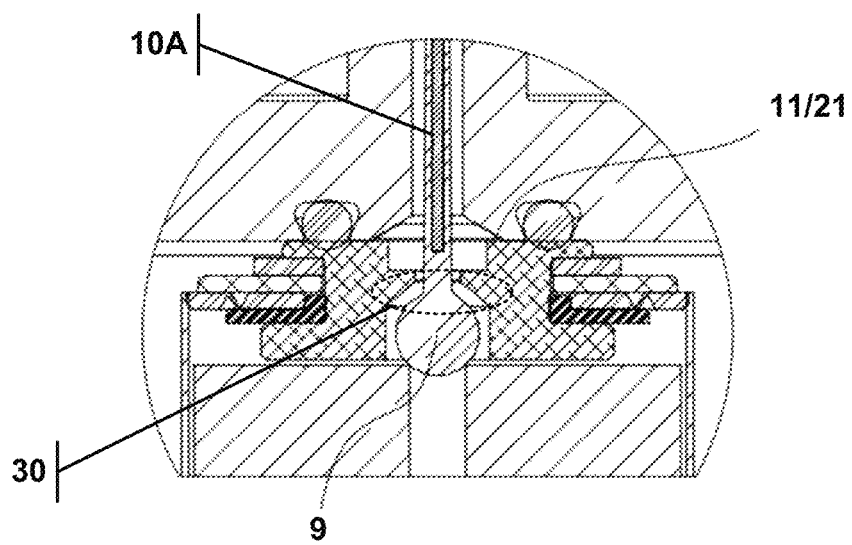
FIG. 6E is an enlarged view of FIG. 6D.
Figure 6F:
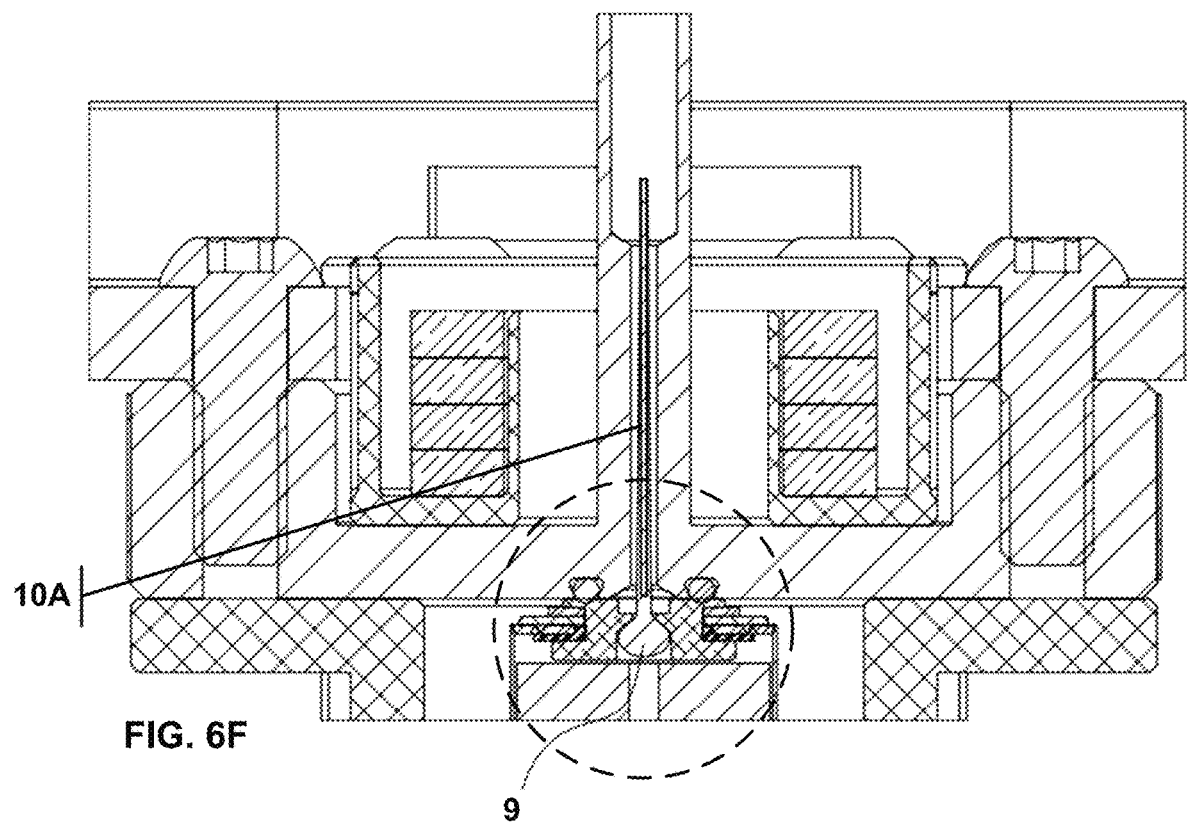
FIG. 6F illustrates the embodiment of FIG. 6A after the permanent magnet has been lowered, and a vacuum has been placed on the pressurized fluid channel, creating a pressure differential between the containment vessel filled with a pressurized fluid and the pressurized fluid channel of the injector assembly, causing the valve plug to deform and seal.
Figure 6G:
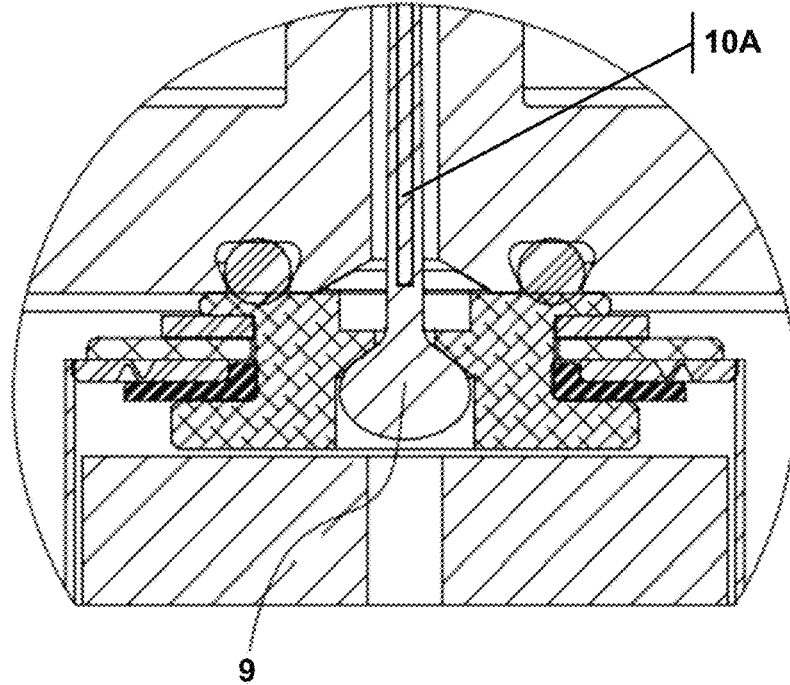
FIG. 6G is an enlarged view of FIG. 6F.
Figure 6H:
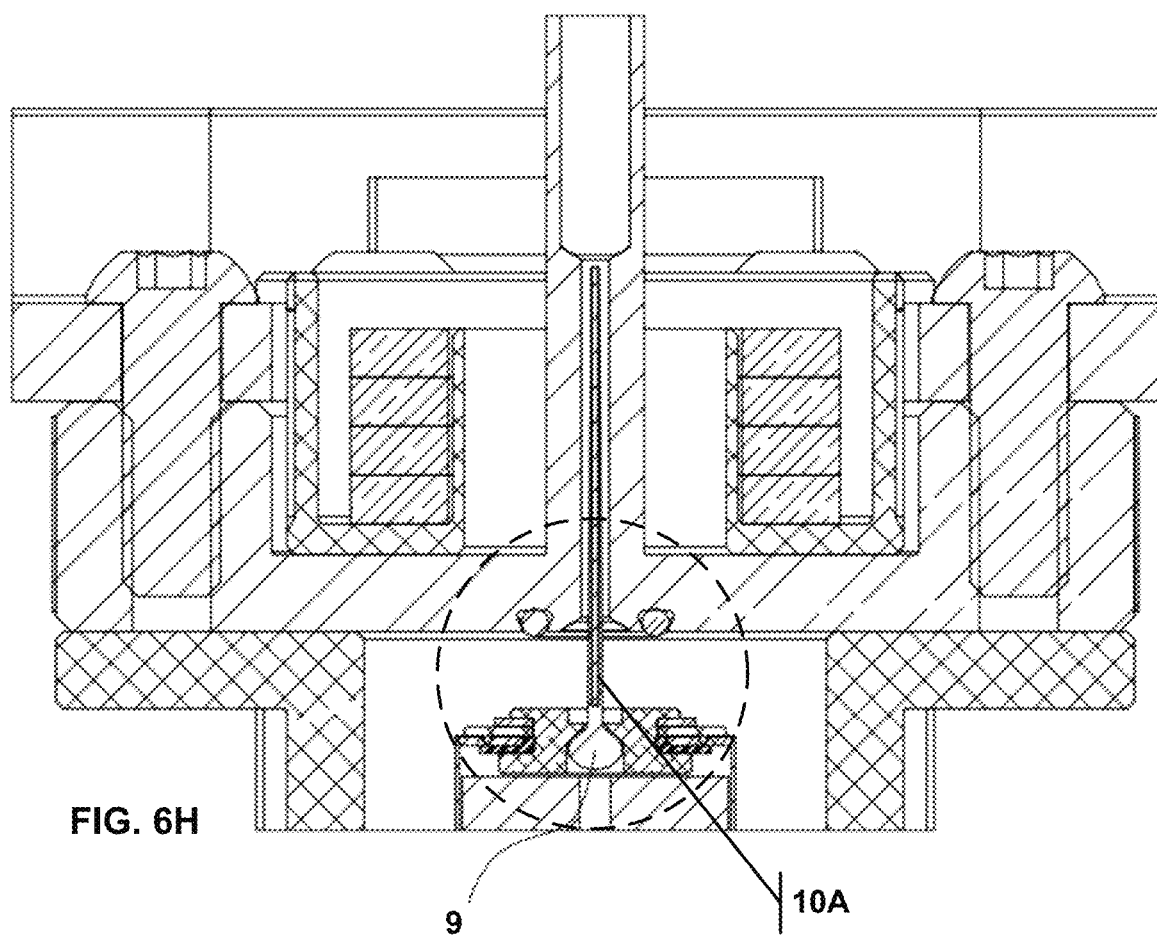
FIG. 6H illustrates the containment vessel separating from the injector assembly after being filled.
Figure 6I:
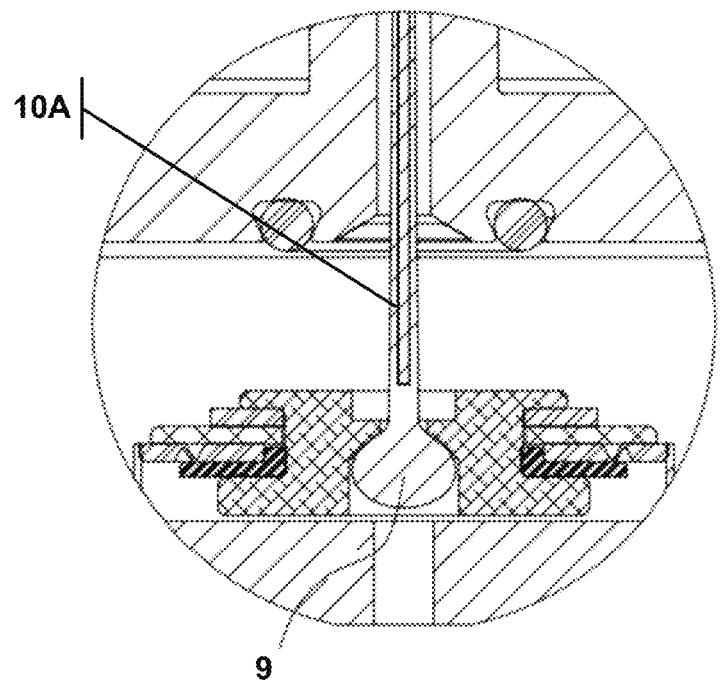
FIG. 6I is an enlarged view of FIG. 6H.

Another example of a non-physical contact actuation method and apparatus is described with reference to FIGS. 6A-6I. Instead of an electromagnet valve plug actuator 25A, the valve plug actuator is a permanent magnet 25B that can move relative to the containment vessel 2 to induce the desired magnetic force. FIG. 6A shows the containment vessel 2 approaching the injector assembly 20. The valve plug actuator 25B is placed in a lower position so as to impart a magnetic force on the elongate member 10A, thus straightening the elongate member 10A to facilitate the proper positioning and insertion of the elongate member. The containment vessel 2 is engaged with the injector assembly 20 such that the elongate member 10A penetrates the injector port 22, and the seal interface 11 forms a fluid-tight seal with the sealing gasket 23, as shown in FIGS. 6B and 6C. The valve plug actuator 25B is then moved 25B1 to an upper position, reducing the magnetic force on the elongate member 10A, allowing the valve plug 9 to dislodge from the valve seat 8 (see dashed oval 30), as shown in FIGS. 6D and 6E. A vacuum may be pulled from the containment vessel 2 to prevent contamination and to ensure an accurate amount of material is delivered. Pressurized fluid is then passed through the pressurized fluid channel 24, through the injector port 22 and into the containment vessel 2. The valve plug actuator 25B is then moved to the lower position, pulling the plug into a sealing position. A vacuum is then pulled on the pressurized fluid channel, creating a pressure differential between the containment vessel and the pressurized fluid channel. The combination of the magnetic force from the valve plug actuator 25B and the high internal pressure of the containment vessel 2 relative to the low vacuum pressure of the pressurized fluid channel causes the valve plug 9 to securely seat against the valve seat 8 as shown in FIGS. 6F and 6G. The containment vessel 2 may be disengaged from the injector assembly 20, as shown in FIGS. 6H and 6I, during which process no fluid loss from within the containment vessel 2 occurs.

Turning to FIGS. 11A-11G2, the valve plug actuator is a rotary shaft actuator 25C that physically contacts the elongate member 10B to seal the containment vessel 2. The rotary shaft actuator 25C may sit within the pressurized fluid channel 24. It is also positioned within the channel 24 such that there are two gaps of differing sizes between the rotary shaft actuator 25C and the walls of the pressurized fluid channel 24. The first is a smaller gap, or an interference zone 45, and the second is a larger gap, or clearance zone 50. Further, the rotary shaft actuator 25C may be connected to a shaft (not shown) which runs external to the injector assembly 20 through a seal (not shown), allowing for external manipulation of the rotary shaft actuator 25C through the shaft without causing a drop in pressure.

The following are preferred steps for injecting a pressurized fluid into a containment vessel 2 using the rotary shaft actuator 25C embodiment.

1. Inserting the elongate member 10B into the pressurized fluid channel 24 and through the center of the rotary shaft actuator 25C, as shown in FIG. 11A.
2. Raising the containment vessel 2 up to the injector seal interface 11, as shown in FIGS. 11B1 and 11B2.
3. Passing a pressurized fluid through the pressurized fluid channel 24, through the injector port 22 and into the containment vessel 2.
4. Rotating the rotary shaft actuator 25C in a direction such that the elongate member 10B spools about the actuator, as shown in FIGS. 11C and 11C1.
5. Further rotation of the rotary shaft actuator 25C such that the elongate member 10B gets pinched in the interference zone 45, 45A between the rotary shaft actuator 25A and the wall of the pressurized fluid channel 24, as shown in FIGS. 11D and 11D1.
6. Further rotation of the rotary shaft actuator 25C such that the elongate member 10B in the clearance zone 50, 50A is pulled in a direction away from the valve plug 9, thus pulling the valve plug 9 against the valve seat 8 and sealing the containment vessel, as shown in FIGS. 11E and 11E1. This pulling may cause the valve plug 9 to deform against the valve seat 8, promoting a tight seal.
7. A vacuum is pulled to clear the pressurized fluid from the pressurized fluid channel 24 and to create a higher pressure differential between the pressurized fluid channel 24 and the inside of the containment vessel 2, which reinforces the valve plug 9 against the valve seat 8. It should be noted that, during the prior step in which a vacuum is pulled, there is no fluid loss from within the containment vessel 2, since the valve plug 9 had already been tightly seated against the valve seat 8.
8. The rotary shaft actuator 25C may be rotated back to its starting position, thus releasing the elongate member 10B, as shown in FIGS. 11F and 11F1.
9. The containment vessel 2 may be disengaged from the injector assembly 20, as shown in FIGS. 11G and 11G1, during which process no fluid loss from within the containment vessel 2 occurs.

Another such method of operation includes a) engaging a seal between the injection system and containment vessel by bringing the injection system seal interface and the containment vessel seal interface together with an interface sealing gasket material; b) injecting the pressurized fluid into the containment vessel; c) running current through the electromagnet to create a magnetic field, which actuates the magnetic object embedded or attached to the elongate member, thus engaging the valve plug against the valve seat and sealing the containment vessel; and d) disengaging the seal between the injection system and containment vessel. Another method includes pulling vacuum between steps a) and b), as well as between steps c) and d). Yet another method includes reversing the magnetic field of the electromagnet to disengage the valve plug from the valve seat after the seal has been formed between the injection system and containment vessel, but before the pressurized fluid has been injected into the containment vessel. Another method includes using one or more permanent magnet(s) for step c), wherein the distance between the permanent magnet and the magnetic object embedded or attached to the elongate member is manipulated such that a magnetic force is induced upon the magnetic object, thus actuating the valve plug tab and engaging the valve plug against the valve seat sealing surface, thus sealing the containment vessel. Another method includes using one or more permanent magnet(s) to disengage the valve plug from the valve seat after the seal has been formed between the injection system and containment vessel, but before the pressurized fluid has been injected into the containment vessel.

Two actuation mechanisms have been constructed and tested. One actuation mechanism used a rotary shaft actuator, and another actuation mechanism used a permanent magnet acting on a 0.01-inch diameter nickel wire within the elongate member. The force on the valve plug was measured in both techniques, shown in FIG. 12. It is shown that the valve plug can be pulled upward with a force measuring over 0.05, lbs. with a magnetic actuation, and measuring over 0.40 lbs. with a rotary shaft actuation. While both forces may be enough to engage a valve plug to seal against a valve plug seat sealing interface, a higher force is preferential from a leak-tight standpoint to ensure that there is no fluid release from the containment vessel.

Figure 7A:
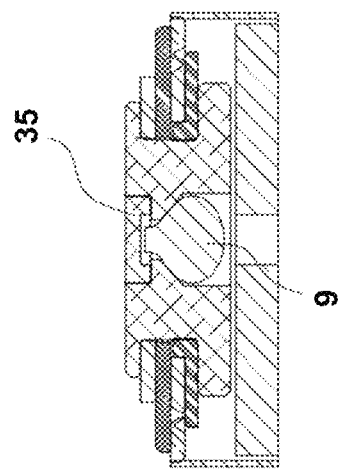
FIG. 7A illustrates the top of the containment vessel after filling, including the intact magnetic on the elongate member.
Figure 7B:
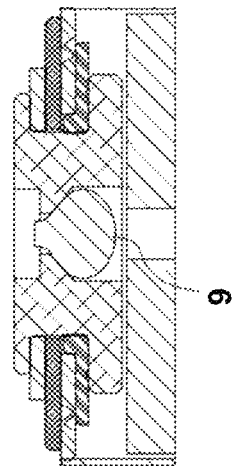
FIG. 7B illustrates the elongate member disconnected from the containment vessel.
Figure 7C:
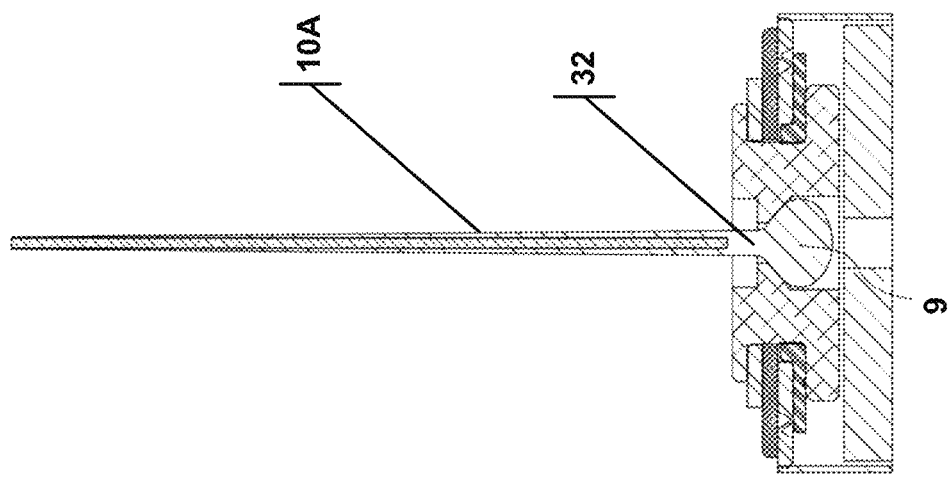
FIG. 7C illustrates the installation of the secondary plug.

After disengagement from the injector assembly, the containment vessel 2 may be permanently sealed to avoid tampering with the valve plug or the elongate member. In FIGS. 7A-7C the elongate member 10A is detached from the valve plug 9 at the separation point 32. A secondary plug 35 may be permanently applied over the vessel port 12. The secondary plug may be any rubber, plastic, metal, or composite material. Examples include silicon, EPDM, PTFE, HDPE, aluminum, stainless steel, copper, or any combination thereof. The secondary plug may be fixed or bonded to the injection port using various methods. Examples include interference fits, welding, brazing, soldering, or the use of adhesives.

The various process flows are shown in FIGS. 8-10.

The elongate member may be comprised of any material that may be affected by a magnetic field, such as nickel, iron, cobalt, neodymium, samarium, holmium, terbium, or alloys thereof.

The valve plug and elongate member may be any elastomer, plastic, metal, or composite material. Examples include silicon, EPDM, PTFE, HDPE, butyl, silicone, buna-n, aluminum, stainless steel, copper, or any combination thereof. The valve plug may also be made of any material that may be affected by a magnetic field such as nickel, iron, cobalt, neodymium, samarium, holmium, terbium, or alloys thereof. The elongate member may be embedded within the valve plug or joined to the valve plug through another physical mechanism, such as being embedded within a rubber overmold. The valve plug may be shaped to complement the shape of the valve seat, and/or may be spherical.

In one aspect of the invention the pressurized fluid is an electrolyte. In another aspect of the invention, the pressurized fluid is a battery electrolyte. In another aspect of the invention, the pressurized fluid is a liquefied gas electrolyte having a vapor pressure greater than above 100 kPa at a temperature of 293.15 K. In another aspect of the invention, the pressurized vessel is an electrochemical energy storage device such as a battery or capacitor.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements and variations can be made without departing from the scope and spirit of this invention, based on what is described and illustrated in this patent document While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A system for injecting a liquefied gas electrolyte having a vapor pressure greater than 100 kPa at a temperature of 293.15 K, the system comprising:
   an electrochemical energy storage device (2) comprising:
      a vessel wall (5);
      a vessel cap (4) sealed onto the vessel wall (5), the cap (4) comprising a valve seat (8), a vessel port (12), a vessel seal interface (11), and a valve plug (9) having an elongate member (10A, 10B) extending out of the vessel port (12);
      a vessel volume (7) defined by the vessel cap (4) and the vessel wall (5);
      wherein the vessel port (12) is in fluid communication with the volume (7), and the elongate member (10A, 10B) defines a longitudinal axis (10C); and
   an injector assembly (20) comprising:
      an injector seal interface (21) comprising an injector port (22) and a sealing gasket (23);
      a pressurized fluid channel (24) in fluid communication with the injector port (22); and
      a valve plug actuator (25A, 25B, 25C) constructed to receive the elongate member (10A, 10B) when the containment vessel (2) is engaged with the injector assembly (20).

2. The system of claim 1, wherein the elongate member (10A) comprises a ferromagnetic or a paramagnetic material, and wherein the valve plug actuator (25A, 25B) is a permanent magnet or an electro-magnet.

3. The system of claim 2, wherein the system comprises:
   an engagement configuration, wherein the elongate member (10A) penetrates the injector port (22), and wherein the seal interface (11) forms a fluid-tight seal with the sealing gasket (23);

a vacuum configuration, wherein the valve plug actuator (25A, 25B) is actuated to cause the elongate member (10A) to push the valve plug (9) in the direction of the longitudinal axis (10C), dislodging the valve plug (9) from the valve seat (8) and actuating a vacuum to pull a vacuum from the vessel volume (7);

an injection configuration wherein the pressurized fluid from a container (100) is injected through the injector port (22), through the vessel port (12) and into the vessel volume (7); and a sealed configuration, wherein the pressurized fluid within the vessel volume (7) forces the valve plug (9) against the valve seat (8), forming a fluid-tight seal.

4. The system of claim 3, further comprising a disengaged configuration after the sealed configuration, wherein the containment vessel (2) is separated from the injector assembly (20).

5. The system of claim 3, wherein the valve plug actuator (25B) is a permanent magnet, and wherein the actuation of the valve plug actuator (25B) comprises moving the permanent magnet towards the containment vessel in the direction of the longitudinal axis (10C).

6. The system of claim 3, wherein the valve plug actuator (25A) is an electro-magnet, and wherein the actuation of the valve plug actuator (25B) comprises electrifying the electro-magnet.

7. The system of claim 1, wherein the valve plug actuator is a rotary shaft actuator (25C).

8. The system of claim 7, wherein the system comprises:
an engagement configuration, wherein the elongate member (10B) penetrates with the injector port (22) and is disposed in the rotary shaft actuator (25C), and wherein the seal interface (11) forms a fluid-tight seal with the sealing gasket (23);

an injection configuration wherein the pressurized fluid from a container (100) is injected through the injector port (22), through the vessel port (12) and into the vessel volume (7); and a sealed configuration, wherein the rotary shaft actuator (25C) is actuated causing the elongate member (10B) to pull the valve plug (9) in the direction of the longitudinal axis (10C), thus forcing the valve plug (9) against the valve seat (8), forming a fluid-tight seal.

9. The system of claim 8, wherein the sealed configuration further comprises deforming the valve plug (9) to form the fluid-tight seal.

10. The system of claim 8, wherein the sealed configuration further comprises spooling the elongate member (10B) around the rotary shaft actuator (25C).

11. The system of claim 8, further comprising a clearance zone (50) and an interference zone (45), both of which are adjacent to the rotary shaft actuator (25C).

12. The system of claim 8, further comprising a disengaged configuration after the sealed configuration, wherein the rotary shaft actuator (25C) is actuated in reverse as compared to the sealed configuration, and wherein the containment vessel (2) is separated from the injector assembly (20).

13. The system of claim 1, wherein the elongate member (10A, 10B) comprises a separation point (32).

14. The system of claim 1, wherein the valve plug (9) is made of rubber and spherical.

* * * * *